(12) United States Patent
Nelson et al.

(10) Patent No.: US 11,090,780 B2
(45) Date of Patent: Aug. 17, 2021

(54) MULTIPURPOSE TOOLING FOR SHAPED PARTICLES

(71) Applicant: 3M INNOVATIVE PROPERTIES COMPANY, St. Paul, MN (US)

(72) Inventors: Thomas J. Nelson, Woodbury, MN (US); Jasmeet Kaur, Sandy Springs, GA (US); Ronald W. Ausen, St. Paul, MN (US); Jaime A. Martinez, Woodbury, MN (US); Edward J. Woo, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 212 days.

(21) Appl. No.: 16/331,279

(22) PCT Filed: Sep. 25, 2017

(86) PCT No.: PCT/US2017/053173
§ 371 (c)(1),
(2) Date: Mar. 7, 2019

(87) PCT Pub. No.: WO2018/063962
PCT Pub. Date: Apr. 5, 2018

(65) Prior Publication Data
US 2019/0351531 A1    Nov. 21, 2019

Related U.S. Application Data

(60) Provisional application No. 62/402,571, filed on Sep. 30, 2016.

(51) Int. Cl.
*B24D 18/00*    (2006.01)
*B24D 3/34*    (2006.01)
*B29D 28/00*    (2006.01)

(52) U.S. Cl.
CPC ......... *B24D 18/0072* (2013.01); *B24D 3/346* (2013.01); *B29D 28/00* (2013.01)

(58) Field of Classification Search
CPC ..... B24D 3/346; B24D 18/0072; B29D 28/00
See application file for complete search history.

(56) References Cited

U.S. PATENT DOCUMENTS

| | | | |
|---|---|---|---|
| 1,910,444 A | 5/1933 | Nicholson | |
| 2,885,703 A | 5/1959 | Elliott | |
| (Continued) | | | |

FOREIGN PATENT DOCUMENTS

| | | |
|---|---|---|
| CN | 1229376 | 9/1999 |
| WO | WO 96/039349 | 12/1996 |
| (Continued) | | |

OTHER PUBLICATIONS

PCT International Search Report for PCT/US2017/053173, dated Dec. 12, 2017, 7 pages.

*Primary Examiner* — Pegah Parvini
*Assistant Examiner* — Ross J Christie

(57) ABSTRACT

A method of transferring a shaped particle to a substrate includes providing a scrim of at least two elongate strands periodically joined together at flexible bond regions to form an array of apertures between the strands. The scrim is extended along at least one direction to increase the minimum dimension of the apertures. Shaped particles are applied to the extended scrim and at least a portion of the shaped particles enter in at least some of the apertures therein. The extended scrim is relaxed and frictionally retains the particles between the elongate strands. The particle loaded scrim is extended along at least one direction to release and transfer the shaped particles to the substrate in a predetermined orientation.

13 Claims, 11 Drawing Sheets

(56) References Cited

U.S. PATENT DOCUMENTS

| | | | |
|---|---|---|---|
| 3,041,156 | A | 6/1962 | Rowse et al. |
| 3,471,588 | A | 10/1969 | Kanner et al. |
| 3,761,991 | A | 10/1973 | Moss |
| 4,314,827 | A | 2/1982 | Leitheiser et al. |
| 4,418,120 | A | 11/1983 | Kealy et al. |
| 4,588,419 | A | 5/1986 | Caul et al. |
| 4,623,364 | A | 11/1986 | Cottringer et al. |
| 4,652,275 | A | 3/1987 | Bloecher et al. |
| 4,734,104 | A | 3/1988 | Broberg |
| 4,737,163 | A | 4/1988 | Larkey |
| 4,744,802 | A | 5/1988 | Schwabel |
| 4,751,138 | A | 6/1988 | Tumey et al. |
| 4,770,671 | A | 9/1988 | Monroe et al. |
| 4,799,939 | A | 1/1989 | Bloecher et al. |
| 4,881,951 | A | 11/1989 | Wood et al. |
| 4,997,461 | A | 3/1991 | Markhoff-Matheny et al. |
| 5,009,675 | A | 4/1991 | Kunz et al. |
| 5,011,508 | A | 4/1991 | Wald et al. |
| 5,042,991 | A | 8/1991 | Kunz et al. |
| 5,085,671 | A | 2/1992 | Martin et al. |
| 5,152,917 | A | 10/1992 | Pieper et al. |
| 5,201,916 | A | 4/1993 | Berg et al. |
| 5,203,884 | A | 4/1993 | Buchanan et al. |
| 5,213,591 | A | 5/1993 | Celikkaya et al. |
| 5,352,254 | A | 10/1994 | Celikkaya |
| 5,366,523 | A | 11/1994 | Rowenhorst et al. |
| 5,378,251 | A | 1/1995 | Culler et al. |
| 5,435,816 | A | 7/1995 | Spurgeon et al. |
| 5,436,063 | A | 7/1995 | Follett et al. |
| 5,496,386 | A | 3/1996 | Broberg et al. |
| 5,520,711 | A | 5/1996 | Helmin |
| 5,609,706 | A | 3/1997 | Benedict et al. |
| 5,672,097 | A | 9/1997 | Hoopman |
| 5,946,991 | A | 9/1999 | Hoopman |
| 5,961,674 | A | 10/1999 | Gagliardi et al. |
| 5,975,987 | A | 11/1999 | Hoopman et al. |
| 5,975,988 | A | 11/1999 | Christianson |
| 5,984,988 | A | 11/1999 | Berg et al. |
| 6,129,540 | A | 10/2000 | Hoopman et al. |
| 6,228,449 | B1 | 5/2001 | Meyer |
| 6,348,249 | B2 | 2/2002 | Meyer |
| 6,465,107 | B1 | 10/2002 | Kelly |
| 6,736,869 | B1 | 5/2004 | Agarwal et al. |
| 8,034,137 | B2 | 10/2011 | Erickson et al. |
| 8,142,531 | B2 | 3/2012 | Adefris et al. |
| 8,142,532 | B2 | 3/2012 | Erickson et al. |
| 8,142,891 | B2 | 3/2012 | Culler et al. |
| 9,017,150 | B2 | 4/2015 | Keipert et al. |
| 2009/0165394 | A1 | 7/2009 | Culler et al. |
| 2009/0169816 | A1 | 7/2009 | Erickson et al. |
| 2012/0227333 | A1 | 9/2012 | Adefris et al. |
| 2013/0040537 | A1 | 2/2013 | Schwabel et al. |
| 2013/0125477 | A1 | 5/2013 | Adefris |
| 2014/0000176 | A1 | 1/2014 | Moren et al. |
| 2014/0170362 | A1 | 6/2014 | Ali et al. |
| 2014/0220328 | A1 | 8/2014 | Ausen et al. |
| 2014/0290147 | A1 | 10/2014 | Seth et al. |

FOREIGN PATENT DOCUMENTS

| | | |
|---|---|---|
| WO | WO 2013/028654 | 2/2013 |
| WO | WO 2014/164242 | 10/2014 |
| WO | WO 2015/100220 | 7/2015 |
| WO | WO 2015/131052 | 9/2015 |
| WO | WO 2016/028683 | 2/2016 |
| WO | WO 2016/106059 | 6/2016 |

MULTIPURPOSE TOOLING FOR SHAPED PARTICLES

BACKGROUND

Abrasive articles generally include abrasive particles (also known as "grains") retained in a binder. During manufacture of various types of abrasive articles, the shaped abrasive particles are deposited on a binder material precursor in an oriented manner (e.g., by electrostatic coating or by some mechanical placement technique). Typically, the most desirable orientation of the shaped abrasive particles is substantially perpendicular to the surface of the backing.

In a coated abrasive article (e.g., sandpaper), the backing is a relatively dense planar substrate. A make layer precursor (or make coat) containing a first binder material precursor is applied to the backing, and then the shaped abrasive particles are partially embedded into the make layer precursor. In some embodiments, the shaped abrasive particles, which have a shape selected for a particular sanding or grinding application, are embedded in the make layer precursor with a preferred orientation. Suitable techniques or orienting the particles include, for example, electrostatic coating or a mechanical placement technique.

The make layer precursor is then at least partially cured to retain the oriented shaped abrasive particles when a size layer precursor (or size coat) containing a second binder material precursor is overlaid on the at least partially cured make layer precursor and oriented shaped abrasive particles. The size layer precursor, and the make layer precursor can then be further cured if needed to form a coated abrasive article.

Substantially all the shaped abrasive particles should remain in their original orientation as embedded in the binder material precursor until the binder precursor material has been sufficiently cured to fix them in place Maintaining the preferred grain orientation can be difficult when the binder precursor material is fluid so that the shaped abrasive particles tip over by gravity, or if the binder precursor material is sufficiently hard that the shaped abrasive particles do not adhere well to the binder precursor material and again tip over due to gravity.

SUMMARY

In general, the present disclosure is directed to a method and apparatus for transferring shaped particles to a target substrate with a net-like transfer tool so that the shaped particles are transferred to the target substrate with a predetermined orientation. The transfer tool includes apertures suitably sized to receive the shaped particles in a predetermined orientation, and once loaded with the shaped particles the transfer tool can retain the shaped particles securely until the shaped particles are transferred to a target substrate in the predetermined orientation. In other embodiments, the loaded transfer tool can itself be transferred to the target substrate and become a reinforcing scrim within the final article to maintain the predetermined alignment on the target substrate of the shaped particles retained therein.

In some embodiments, the transfer tool includes a scrim including a netting-like array of elongate strands joined by intermittent bond regions along their length. The bond regions form an array of apertures each having a first minimum dimension. When the scrim is extended along at least one direction, the bonds in the scrim flex and the minimum dimensions of the apertures increase to a second dimension larger than the first dimension. The enlarged apertures to allow the scrim to receive a shaped particle in a predetermined orientation. When the scrim is returned to its original unextended state, the apertures return to the first original dimensions, which are suitably sized to frictionally engage the strands and lock in the shaped particles in the apertures in the predetermined orientation. The scrim and particles may then be transferred to another location. A subsequent extension step extends the scrim to enlarge the minimum dimensions of the apertures to the second dimensions, which release the shaped particles onto the target substrate in a preferred orientation. The released particles may in some embodiments adhere to a particle adherent layer on the target substrate.

In one embodiment, the present disclosure is directed to a method of transferring a shaped particle to a substrate, the method including:

providing a scrim including at least two elongate strands periodically joined together at bond regions to form an array of apertures between the strands, wherein the apertures have a first minimum dimension, and wherein at least some of the bond regions are flexible;

extending the scrim along at least one direction to form an extended scrim, wherein in the extended scrim the apertures increase in size to a second minimum dimension larger than the first minimum dimension to form an array of extended apertures;

applying shaped particles to the extended scrim such that at least a portion of the shaped particles enter in at least some of the extended apertures;

relaxing the extended scrim to form an array of unextended apertures with the first minimum dimension, wherein the shaped particles are frictionally retained in the unextended apertures to form a particle loaded scrim;

extending the particle loaded scrim along at least one direction to form an extended particle loaded scrim with extended apertures having the second minimum dimension, wherein in the extended particle loaded scrim the shaped particles are released from the extended apertures; and transferring the shaped particles released from the extended particle loaded scrim to the substrate such that the shaped particles are deposited on the substrate in a predetermined orientation.

In another embodiment, the present disclosure is directed to a method of transferring shaped particles to a moving substrate web, the method including:

providing a transfer tool moving in a first direction, wherein the transfer tool includes a stretchable net-like arrangement of polymeric strands periodically joined together at bond regions to form an array of apertures therebetween, and wherein the apertures have a first minimum dimension;

emitting shaped particles from a particle source onto a major surface of the moving transfer tool;

stretching the transfer tool along a second direction substantially normal to the first direction to form a stretched transfer tool, wherein the stretched transfer tool comprises expanded apertures with a second minimum dimension larger than the first minimum dimension, and wherein the second minimum dimension is sufficiently large to allow entry of at least a portion of the shaped particles into the apertures with a first predetermined orientation;

relaxing the stretched transfer tool along the second direction such that the apertures return to the first minimum dimension and form a loaded transfer tool having particles frictionally retained between the polymeric strands in the first orientation;

stretching the loaded transfer tool along the second direction to expand the apertures to the second minimum dimension and release the shaped particles frictionally retained therein; and transferring the shaped particles released from the loaded transfer tool to a particle adherent surface of a moving substrate web, wherein a substantial portion of the shaped particles are transferred to the particle adherent surface and adhere to the particle adherent surface in a second predetermined orientation.

In another embodiment, the present disclosure is directed to an abrasive article including an adhesive binder layer on a backing; shaped abrasive grains on the adhesive binder layer, wherein the shaped abrasive grains include uniform triangular prisms, wherein at least 95% of the grains contact the adhesive binder layer in an orientation such that one side thereof is substantially parallel to a major surface of the backing, and wherein a vertex of each grain opposite the one side contacting the adhesive binder layer extends above the adhesive binder layer.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 7A is an overhead view of a triagonal prism shaped abrasive grain used in the working example of the present disclosure, while

DETAILED DESCRIPTION

Figure 1:
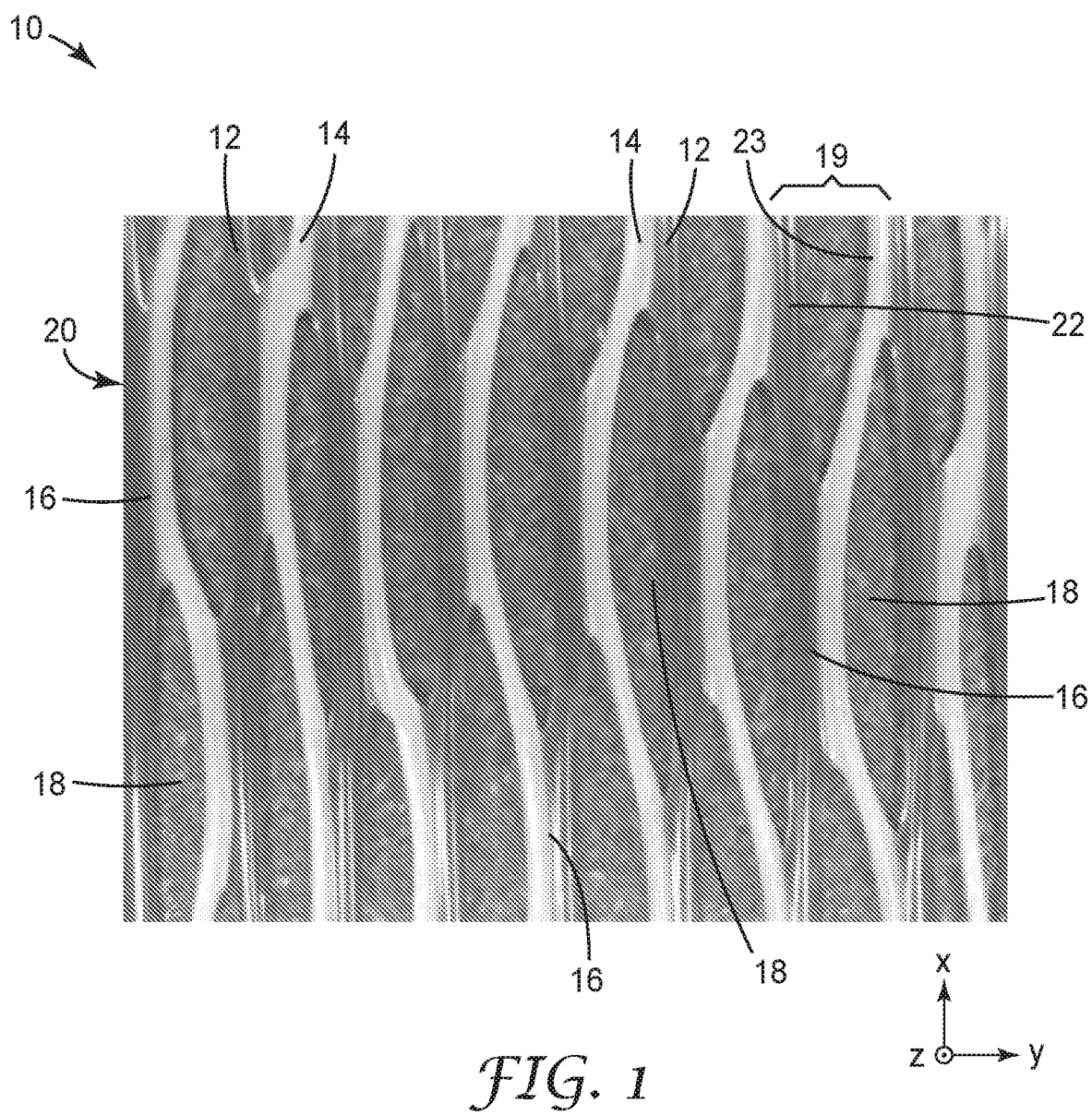
FIG. 1 is an overhead view of an embodiment of a transfer tool according to the present disclosure.

Referring to FIG. 1, the present disclosure is directed to a transfer tool 10 for retaining and transferring shaped particles. The transfer tool 10 includes a netting-like extendable scrim with an array 20 of elongate strands 12, 14 that extend along the x-direction and are periodically joined together at bond regions 16 throughout the array. The strands 12, 14 create a net-like network occupying the x-y plane in FIG. 1 and having a first major surface 22 and a second major surface 23. The array 20 of the interconnected strands 12, 14 includes a corresponding array of apertures 18 between the bond regions 16 on adjacent strand pairs 19. The apertures 18 are arranged in offset lines between the strands 12, 14, and have a first minimum dimension when the scrim is in a relaxed (unextended) state. In the embodiment of FIG. 1, when the transfer tool 10 is extended along the y-direction to an extended state, the bond regions 16 flex and the sizes of the apertures 18 in the array 20 increase from the first minimum dimension to a second minimum dimension larger than the first minimum dimension.

The elongate strands 12, 14 can be made of any suitable material that can be joined together at the bond regions 16 to provide a network having bond regions sufficiently flexible to allow mechanical opening and closing of the apertures 18. The flexible network or array 20 can be made of any strand material or combination of materials that can be joined together to form flexible bond regions 16. The flexible bond regions 16 should be capable of being substantially reversibly stretched, bent or deformed in at least one direction such that the bond regions 16 flex and enlarge the apertures 18 from the first minimum dimension to the second minimum dimension.

When the transfer tool 10 is in the extended state and the apertures 18 are enlarged, the apertures 18 have a minimum dimension (referred to above as the second minimum dimension sufficient to allow entry into the apertures 18 of a selected orientation of a shaped particle with a predetermined shape, size, aspect ratio or combination thereof. When returned to the original unextended shape, the bond regions 16, the minimum dimensions of the apertures 18 are correspondingly reduced (referred to above as the first minimum dimension). The return of the bond regions 16 to their original unextended shape and the resulting closing of the apertures from the second minimum dimension to the first minimum dimension frictionally retains the shaped particles in the apertures 18 in a selected orientation against the strands 12, 14.

As shown in FIG. 1, the strands 12, 14 have a longest dimension, referred to herein as the machine direction x, and a cross-machine direction y that is substantially normal to the machine direction. In various embodiments, the array 20 may be extended in the machine direction (x-direction in FIG. 1), the cross-machine direction (y-direction in FIG. 1), or both directions, to deform the bond regions 16 as needed to facilitate the mechanical opening and closing of the apertures 18 to accept or retain shaped particles. In the example embodiment of FIG. 1, the array 20 is extended in the cross-machine direction to bend the bond regions 16 and enlarge the minimum dimensions of the apertures 18.

For example, as will be shown in the discussion that follows, shaped particles can fall or be drawn onto a surface of the unextended transfer tool 10, and will remain on the surface of the transfer tool in random orientations. When the transfer tool 10 is in the extended state, the particles with a selected size, shape and aspect ratio can enter into the apertures 18 in a preferred orientation. When the transfer tool 10 is returns to the unextended state, either forcibly or as a result of the material properties of the strands 12, 14 and the bond regions 16, the apertures are reduced in size and the shaped particles are frictionally restrained in the preferred orientation between adjacent strand pairs 12, 14 forming an aperture 18. The retained particles thus extend along a z-direction above and below the x-y plane of the array 20. As discussed in more detail below, the shape of the apertures 18 may vary widely depending on the materials selected for the strands 12, 14 and the conditions utilized to make the arrays 20.

Suitable materials for the strands 12, 14 include, but are not limited to, polymeric materials and metals. In one embodiment, the strands 12, 14 are the filamentous elements of a metal mesh made from a sheet of metal that has been uniformly slit and extended along at least one direction, forming diamond-shaped apertures in the sheet. Suitable metals for the strands 12, 14 include, but are not limited to, aluminum, steel, stainless steel, various shape-memory alloys, and the like. In another embodiment, the metal mesh may be made from wires of metals such as, aluminum, brass, bronze, copper, steel, stainless steel, shape memory alloys and the like that are woven together or welded together at the bond regions to form a flexible network of bond regions 16 with square, rectangular or diamond-shaped apertures. Suitable materials include, but are not limited to, expanded metal mesh and wire mesh materials available from McNichols Co., Minneapolis, Minn.

In another embodiment, the strands 12, 14 can be made of metal materials that are joined together in the bond regions 16 with clips, pins, links and the like to form a flexible metal mesh-like array of apertures. Any suitable fasteners can be used to form the bond regions 16, as long as the bond regions 16 are sufficiently flexible to permit the mechanical opening and closing of the apertures 18.

In another embodiment, the strands 12, 14 are made from polymeric materials that can be woven together or joined together at bond regions to form a flexible network with apertures suitably sized to accept and at least temporarily retain a selected shaped particle. In one embodiment, which is not intended to be limiting, the net-like arrays 20 can be produced by extruding polymeric materials through an extrusion die including a plurality of shims arranged to define a cavity with alternating first and second dispensing orifices. A first polymeric material is extruded through the first dispensing orifices a first strand speed to form the polymeric strands 12, and a second polymer is simultaneously extruded through the second dispensing orifices at a second strand speed different from the first strand speed the polymeric strands 14. The first polymeric strands 12 and the second polymeric strands 14 join together at selected bond regions 16 to form an interlocking netting array 20 with apertures 18. For example, in some embodiments, the first strand speed is at least 2 (in some embodiments, in a range from 2 to 6, or even 2 to 4) times the second strand speed. Details of shim designs and cavity shapes that can be used to make the netting-like arrays 20 can be found in, for example, WO 2003/028654, which is incorporated herein by reference.

In some embodiments of the arrays 20, the polymers of the first and second polymeric strands 12, 14 are the same, while in others the polymers are different. The polymers used to make netting and arrays of polymeric strands described herein are selected to be compatible with each other such that the first and second strands bond together at the bond regions 16. In the extrusion methods described above for making the nettings and arrays 20 of the polymeric strands 12, 14, the bonding between strands that forms the bond regions 16 between adjacent strands occurs in a relatively short period of time (typically less than 1 second). The bond regions 16, as well as the strands 12, 14, can be cooled through air and natural convection and/or radiation after emerging from the extrusion die. In selecting polymers for the strands, 12, 14, it may be desirable to select polymers that have dipole interactions (or H-bonds) or covalent bonds. In some embodiments, bonding between the strands 12, 14 can be improved by increasing the time that the strands are molten to enable more interaction between the polymers. In some embodiments, bonding of the polymers in the strands 12, 14 can be improved by reducing the molecular weight of at least one polymer and or introducing an additional co-monomer to improve polymer interaction and/or reduce the rate or amount of crystallization. In some embodiments, the bond strength in the bond regions 16 is greater than the strength of the strands 12, 14 forming the bond. In some embodiments, it may be desirable for the bond regions 16 to break and thus the bonds will be weaker than the strands 12, 14.

Suitable polymeric materials for extrusion to form the strands 12, 14 include, but are not limited to, thermoplastic polymers. Suitable thermoplastic polymers for the polymeric arrays include polyolefin homopolymers such as polyethylene and polypropylene, copolymers of ethylene, propylene and/or butylene; copolymers containing ethylene such as ethylene vinyl acetate and ethylene acrylic acid; ionomers based on sodium or zinc salts of ethylene methacrylic acid or ethylene acrylic acid; polyvinyl chloride; polyvinylidene chloride; polystyrenes and polystyrene copolymers (styrene-maleic anhydride copolymers, styrene acrylonitrile copolymers); nylons; polyesters such as poly(ethylene terephthalate), polyethylene butyrate and polyethylene napthalate; polyamides such as poly(hexamethylene adipamide); polyurethanes; polycarbonates; poly(vinyl alcohol); ketones such as polyetheretherketone; polyphenylene sulfide; polyacrylates; cellulosics; fluoroplastics; polysulfones; silicone polymers; and mixtures thereof. The die and method according to the present disclosure may also be useful for coextruding polymeric materials that can be crosslinked (e.g., by heat or radiation). When a heat curable resin is used, the die can be heated to start the cure so as to adjust the viscosity of the polymeric material and/or the pressure in the corresponding die cavity.

In some embodiments, at least one of the polymeric strands 12, 14 is made from a polyolefin (e.g., polyethylene, polypropylene, polybutylene, ethylene copolymers, propylene copolymers, butylene copolymers, and copolymers and blends of these materials).

In some embodiments the polymer selected for the strands 12, 14 can be have adhesive properties to assist in retaining the shaped particles, and suitable adhesives include, but are not limited to, acrylate copolymer pressure sensitive adhesives, rubber based adhesives (e.g., those based on natural rubber, polyisobutylene, polybutadiene, butyl rubbers, styrene block copolymer rubbers, etc.), adhesives based on silicone polyureas or silicone polyoxamides, polyurethane type adhesives, and poly(vinyl ethyl ether), and copolymers or blends of these. Other desirable materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefins, polyimides, mixtures and/or combinations thereof.

In some embodiments, a release material may also be extruded with the polymeric materials forming the polymeric strands 12, 14 to facilitate removal or dislodgement of the shaped particles from the strands 12, 14. Exemplary release materials include, but are not limited to, silicone-grafted polyolefins such as those described in U.S. Pat. No. 6,465,107 (Kelly) and U.S. Pat. No. 3,471,588 (Kanner et al.), silicone block copolymers such as those described in PCT Publication No. WO96039349, or low density polyolefin materials such as those described in U.S. Pat. No. 6,228,449 (Meyer), U.S. Pat. No. 6,348,249 (Meyer), and U.S. Pat. No. 5,948,517 (Meyer).

In some embodiments, the first and second polymeric materials used to make the polymeric strands 12, 14 to form the arrays 20 each have a different modulus (i.e., one relatively higher to the other). In some embodiments using first and second polymeric materials to make nettings and arrays of polymeric strands described herein, each have a different yield strength.

In some embodiments, polymeric materials used to make the polymeric strands 12, 14 and form the arrays 20 may include a colorant (e.g., pigment and/or dye) for functional (e.g., optical effects) and/or aesthetic purposes (e.g., each has different color/shade). Suitable colorants are those known in the art for use in various polymeric materials. Exemplary colors imparted by the colorant include white, black, red, pink, orange, yellow, green, aqua, purple, and blue. In some embodiments, it is desirable level to have a certain degree of opacity for one or more of the polymeric materials. The amount of colorant(s) to be used in specific embodiments can be readily determined by those skilled in the (e.g., to achieve desired color, tone, opacity, transmissivity, etc.). If desired, the polymeric materials may be formulated to have the same or different colors.

In some embodiments, which are not intended to be limiting, the arrays 20 of polymeric strands 12, 14 have a basis weight in a range from 5 g/m² to 400 g/m² (in some embodiments, 10 g/m² to 200 g/m²). In various embodiments, which are not intended to be limiting, the arrays 20 have a basis weight in a range from 0.5 g/m² to 40 g/m² (in some embodiments, 1 g/m² to 20 g/m²). In some embodiments, which are not intended to be limiting, the arrays 20 have a strand pitch in a range from 0.5 mm to 20 mm (in some embodiments, in a range from 0.5 mm to 10 mm).

Optionally, the arrays 20 of polymeric strands 12, 14 described herein are attached to a reinforcing backing (not shown in FIG. 1). The backings may be, for example, one of a film, net, or non-woven.

In some embodiments, the polymeric strands 12, 14 are elastic. In this application elastic means that one or both of the polymeric materials making up the strands 12, 14 will substantially resume its original shape after being stretched (i.e., will sustain only small permanent set following deformation and relaxation which set is less than 20 percent (in some embodiments, less than 10 percent) of the original length at moderate elongation (i.e., about 400-500%; in some embodiments, up to 300% to 1200%, or even up to 600 to 800%) elongation at room temperature). The elastic polymeric materials that can be used for the polymeric strands 12, 14 can be both pure elastomers and blends with an elastomeric phase or content that will still exhibit substantial elastomeric properties at room temperature.

In various embodiments, the polymeric strands 12, 14 may be heat-shrinkable or non-heat shrinkable elastics, or combinations thereof. Non-heat shrinkable means that the elastomer, when stretched, will substantially recover sustaining only a small permanent set as discussed above.

For example, suitable elastic materials for the polymeric strands 12, 14 include, but are not limited to, thermoplastic elastomers such as ABA block copolymers, polyurethane elastomers, polyolefin elastomers (e.g., metallocene polyolefin elastomers), polyamide elastomers, ethylene vinyl acetate elastomers, polyvinyl ethers, acrylics, especially those having long chain alkyl groups, poly-alpha-olefins, asphaltics, silicones, polyester elastomers, and natural rubber. An ABA block copolymer elastomer generally includes A blocks that are polystyrenic, and B blocks that are conjugated dienes (e.g., lower alkylene dienes). The A block is generally formed predominantly of substituted (e.g., alkylated) or unsubstituted styrenic moieties (e.g., polystyrene, poly(alphamethylstyrene), or poly(t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted, and has an average molecular weight from about 5,000 to 500,000 grams per mole. The A and B blocks may be configured, for example, in linear, radial, or star configurations. An ABA block copolymer may contain multiple A and/or B blocks, which may be made from the same or different monomers. A typical block copolymer is a linear ABA block copolymer, where the A blocks may be the same or different, or a block copolymer having more than three blocks, predominantly terminating with A blocks. Multi-block copolymers may contain, for example, a certain proportion of AB diblock copolymer, which tends to form a tackier elastomeric film segment. Other elastic polymers can be blended with block copolymer elastomers, and various elastic polymers may be blended to have varying degrees of elastic properties.

Many types of thermoplastic elastomers are commercially available, including those from BASF, Florham Park, N.J., under the trade designation "STYROFLEX" from Kraton Polymers, Houston, Tex., under the trade designation "KRATON" from Dow Chemical, Midland, Mich., under the trade designation "PELLETHANE," "ENGAGE," "INFUSE," VERSIFY," and "NORDEL" from DSM, 25 Heerlen, Netherlands, under the trade designation "ARNITEL" from E. I. duPont de Nemours and Company, Wilmington, Del., under the trade designation "HYTREL," from ExxonMobil, Irving, Tex. under the trade designation "VISTAMAXX."

Mixtures of any of the above-mentioned polymers may be useful in the polymeric net-like arrays 20. For example, a polyolefin may be blended with an elastomeric polymer to lower the modulus of the polymeric composition, which may be desirable for certain applications. Such a blend may or may not be elastic.

In some embodiments, which are not intended to be limiting, the arrays 20 described herein of alternating first and second strands 12, 14 exhibit at least one of diamond-shaped, hexagonal-shaped, ovoid shaped apertures 18, and combinations thereof. For example, long bond lengths, relative to the pitch of the bond in the machine direction (x direction in FIG. 1), tend to create arrays 20 with diamond shaped apertures 18, whereas short bond lengths tend to create arrays 20 with hexagon shaped apertures 18.

In some embodiments, for example, the first and second strands 12, 14 have an average width along the x-y direction in FIG. 1 of about 10 micrometers to about 500 micrometers (or about 10 micrometers to about 400 micrometers, or even about 10 micrometers to about 250 micrometers). In some embodiments, for example, the bond regions 16 have an average largest dimension along the z-direction in FIG. 1 perpendicular to the strand thickness, wherein the strands 12, 14 have an average width, and wherein the average largest dimension of the bond regions is at least 2 (in some embodiments, at least 2.5, 3, 3.5, or even at least 4) times greater than the average width of the strands 12, 14.

Figure 2:
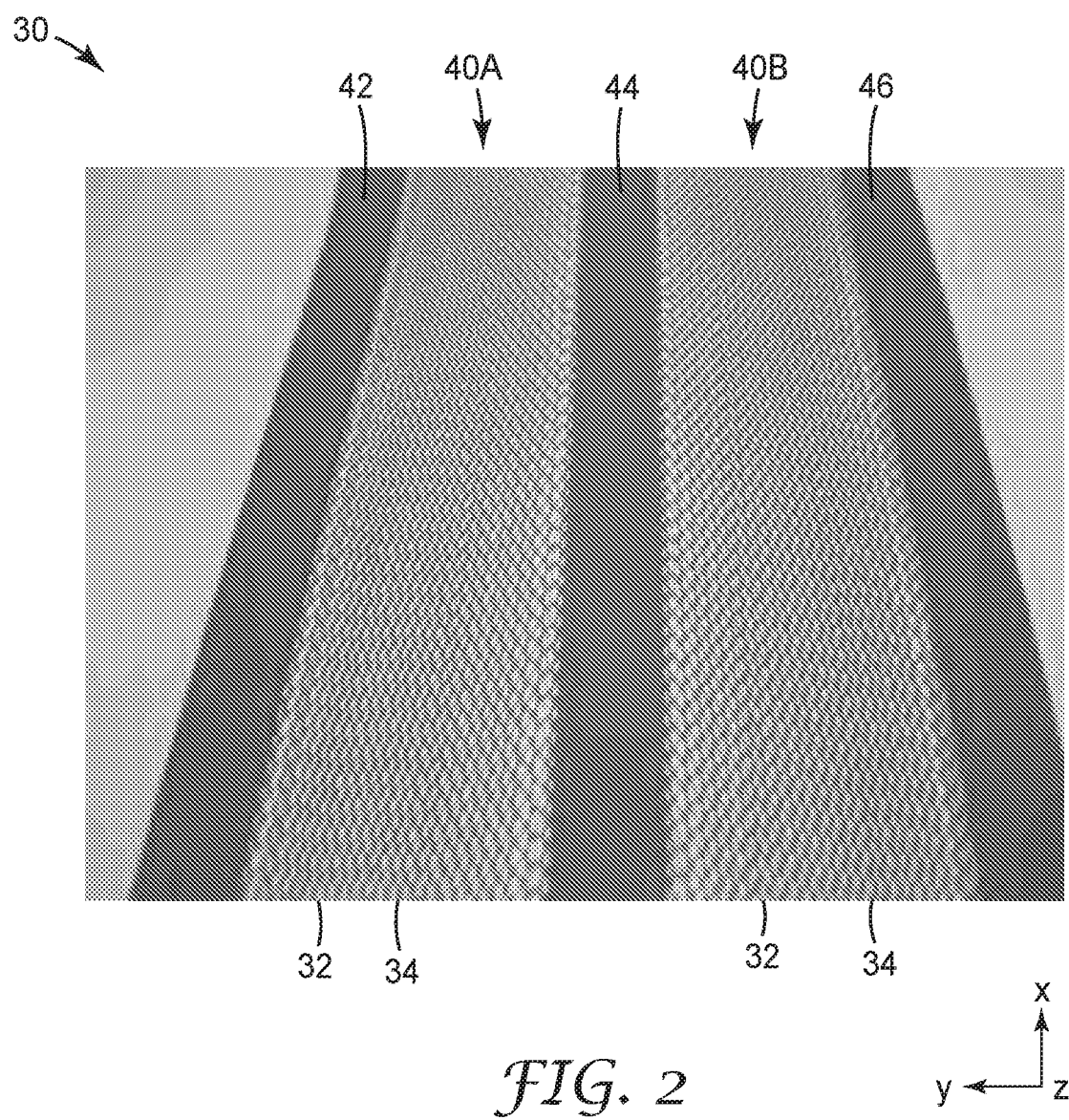
FIG. 2 is a perspective view of another embodiment of a transfer tool according to the present disclosure.

Referring to FIG. 2, in some embodiments a transfer tool 30 includes two net-like arrays 40A, 40B, each made from polymeric strands 32, 34. The arrays 40A, 40B are disposed between ribbon regions 42, 44, 46. In some embodiments, the arrays 40A, 40B and the ribbon regions 42, 44, 46 are integral.

Figure 3:
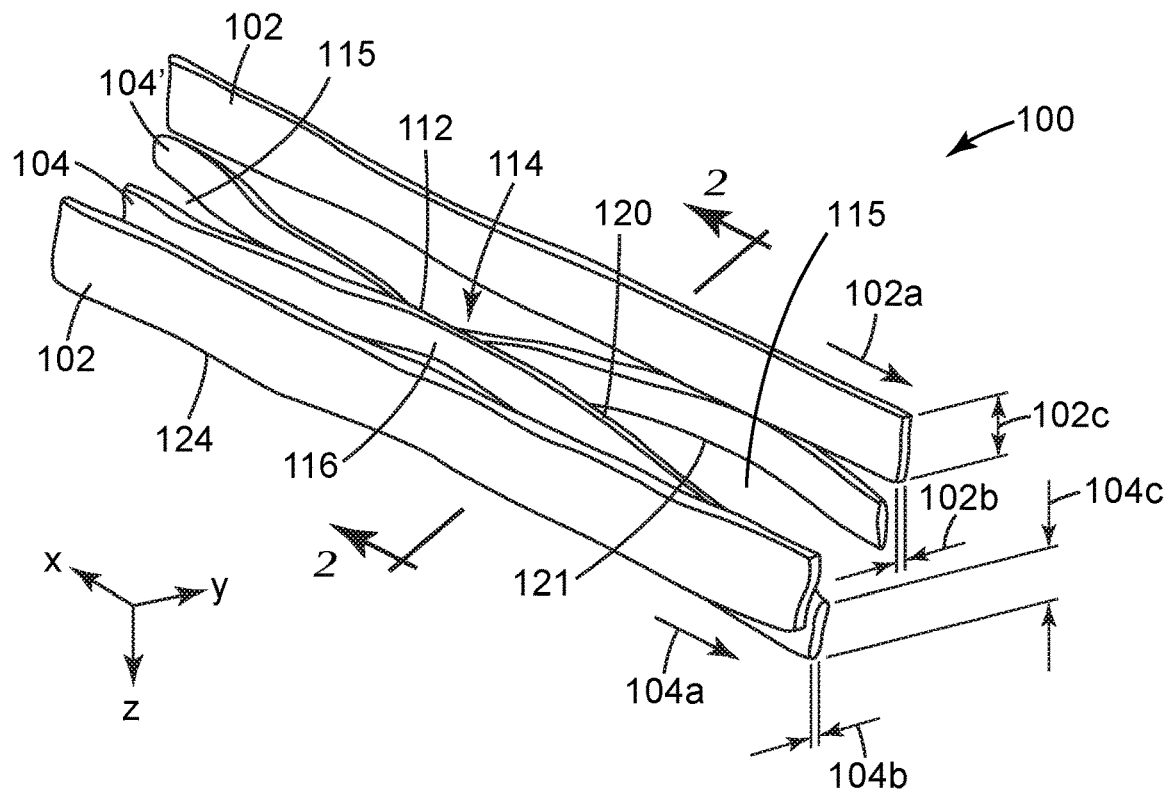
FIG. 3 is a perspective view of a portion of an embodiment of a transfer tool with polymeric strands and ribbons.
Figure 4:
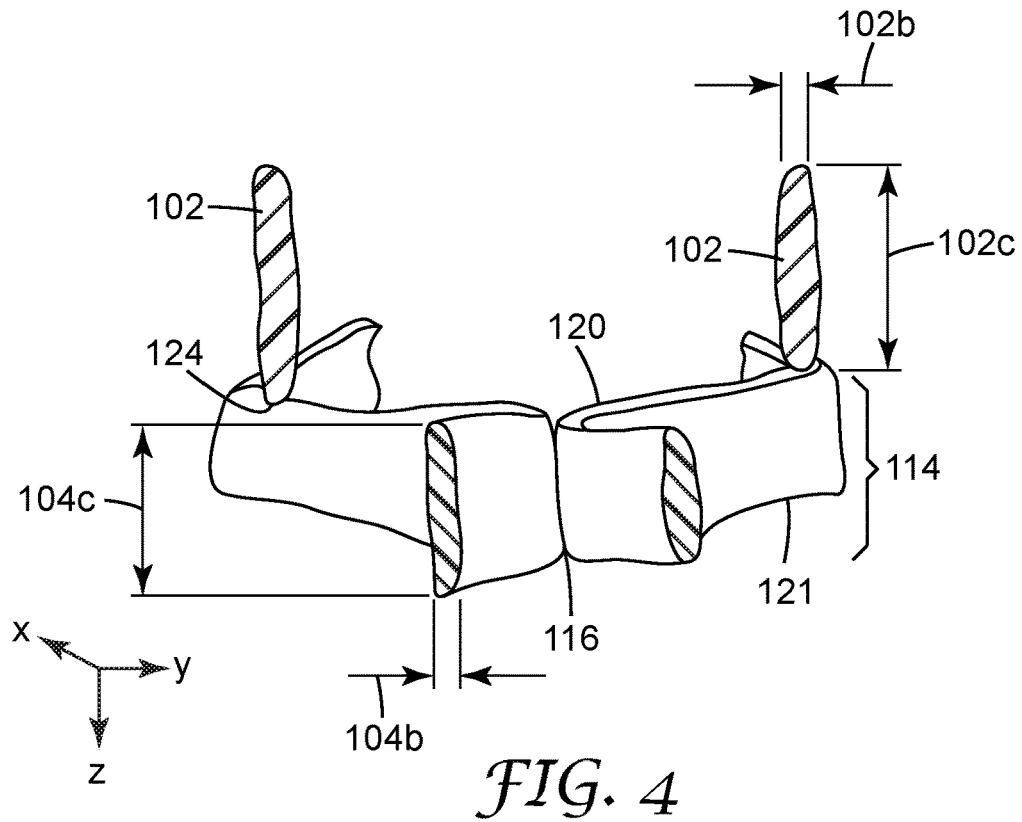
FIG. 4 is a view of the transfer tool of FIG. 1 along the direction of the arrow 2 of FIG. 3.

Referring now to FIGS. 3-4, in another embodiment a polymeric array 100 includes polymeric strands 104 and 104' extending along the x-direction that form a net-like array 114 in the x-y plane with apertures 115. The polymeric strands 104 and 104' may be of the same or different materials and/or the same or different dimensions as described above with reference to the embodiment of FIG. 1. The polymeric strands 104, 104' are bonded together at bond regions 112 to form the netting layer 114. Adjacent polymeric strands in the array 114 are bonded intermittently at multiple bond regions 116 along their respective lengths. The array 114 has first and second opposing major surfaces 120, 121.

The polymeric array 100 further includes an arrangement of polymeric ribbons 102 extending along the x-direction and attached at one or more points to the polymeric strands 104, 104'. The polymeric ribbons may be made from any extrudable polymeric material that is compatible with the polymeric materials selected for the polymeric strands 104, 104'. Examples of suitable polymeric ribbon designs are shown in 3M File No. 76015 and 74807 (WO 2006/106059 and WO 2015/131052). In various embodiments, the polymeric ribbons may extend along the first major surface 120 of the netting layer 114 as illustrated in FIG. 3, or may extend along both the first major surface 120 and the second major surface 121 of the netting layer 114.

In various embodiments, the polymeric strand 104, 104' and the polymeric ribbons 102 are made from any polymeric material that can be joined together at bond regions 16, with the bond regions 112 being sufficiently flexible to allow the mechanical opening and closing of the apertures 115 when the netting layer 114 is stretched along the y-direction in FIGS. 3-4. In some embodiments one or both of the polymeric strands 104, 104' are elastic, or all the polymeric ribbons 102 and polymeric strands 104, 104' are elastic.

In some embodiments, a single strand of the polymeric strands 104, 104' or a single ribbon of the polymeric ribbons 102 in the array 100 may include different polymeric compositions. For example, at least one of the polymeric strands 104, 104' in the array 100 may have a core made of one polymeric composition and a sheath of a different polymeric composition. Such net-like arrays can be extruded as described in U.S. Pub. No. 2014/220328 (Ausen et al.), the disclosure of which is incorporated herein by reference. Nets in which their opposing major surfaces are made from different polymeric compositions are described in co-pending PCT Pub. No WO2014/164242.

In some embodiments of the array 100 the distance between bonds can be from about 0.5 mm to about 20 mm (in some embodiments, from 0.5 mm to 10 mm). In some embodiments, the arrays have a basis weight in a range from 5 g/m² to 750 g/m² (in some embodiments, 5 g/m² to 400 g/m² or 10 g/m² to 200 g/m²). In some embodiments the arrays 100 have a thickness of up to about 4 mm (in some embodiments, up to 3.5 mm, 3 mm, 2 mm, 1 mm, 0.75 mm, or less than 0.75 mm; from 10 micrometers to 4 mm, 10 micrometers to 3.5 mm, 10 micrometers to 3 mm, 10 micrometers to 2 mm, 10 micrometers to 1 mm, 10 micrometers to 750 micrometers, 10 micrometers to less than 750 micrometers, 10 micrometers to 749 micrometers, 10 20 micrometers to 700 micrometers, or 10 micrometers to 650 micrometers).

Each polymeric ribbon 102 and polymeric strand 104 has a length, a width, and a thickness (e.g., length 102a, 104a, width, 102b, 104b, and thickness 102c, 104c), wherein the length is the longest dimension along the x-direction and the width is the shorter dimension extending along the y-direction, the length and the width are perpendicular to each other, and the thickness extends along the z-direction and is perpendicular to the length and the width. The polymeric ribbons 102 have a thickness-to-width aspect ratio of at least 2:1 (in some embodiments, at least 3:1) and minor surface 124 defined by their width and length. The minor surface 124 of the plurality of polymeric ribbons 110 is bonded to first major surface 120 of the netting layer 114 along one or more of the polymeric strands 104, 104'.

In some embodiments, each polymeric ribbon 102 is bonded to only one of the polymeric strands 104, 104'. In some embodiments, each polymeric ribbon 102 is intermittently bonded to a strand 104, 104'. In some embodiments, each polymeric ribbon 102 is continuously bonded along the length of a strand 104, 104'. In some embodiments, at least some of the polymeric ribbons 102 have a width that is smaller than a width of at least some of the polymeric strands 104, 104'. In some embodiments, at least some of the polymeric ribbons 102 have a height that is greater than a height of at least some of the polymeric strands 104, 104'. In some embodiments, the minor surface 124 of a second plurality of the polymeric ribbons 102 is bonded to the second major surface 121 of the array 114.

Figure 5:
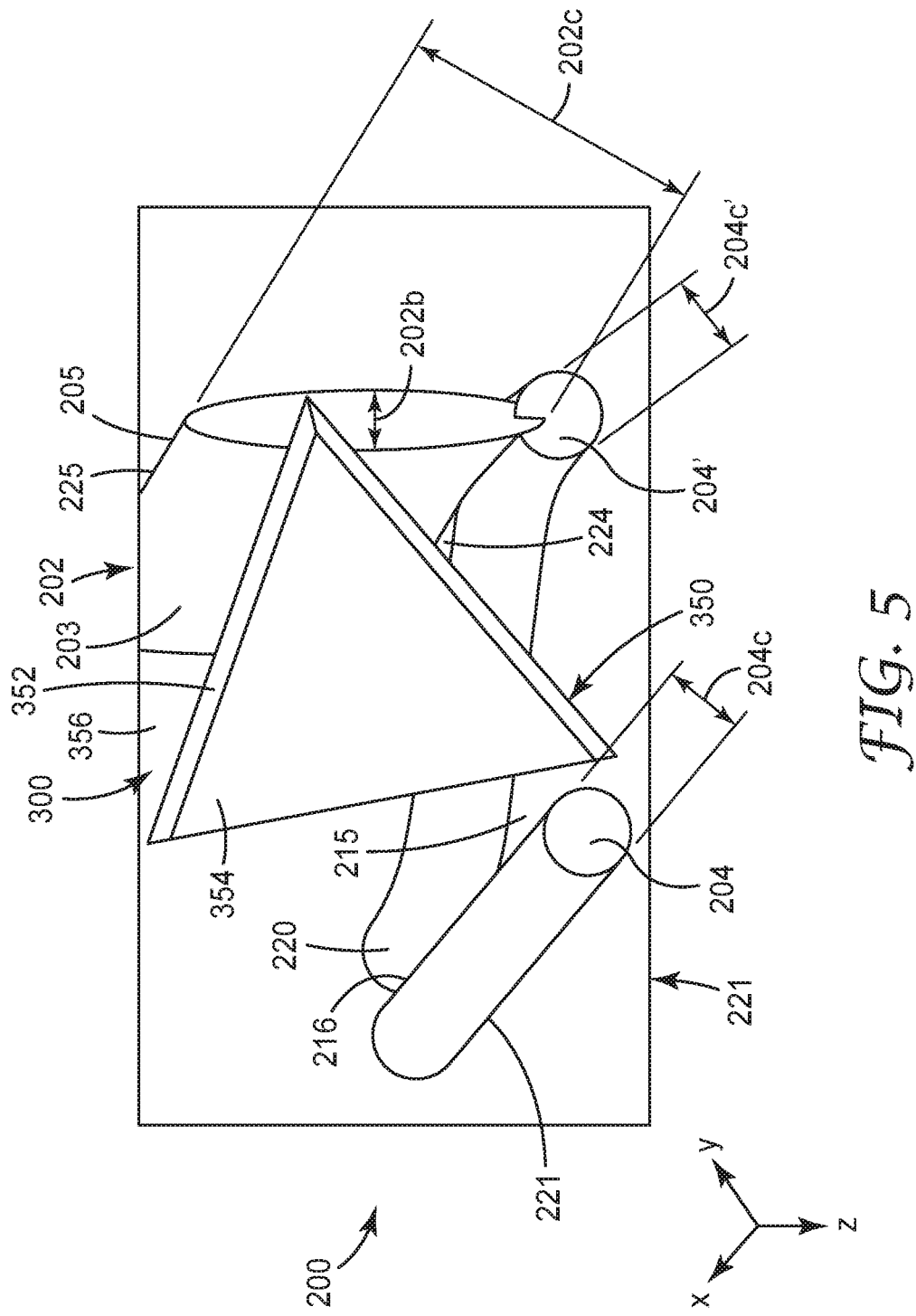
FIG. 5 is a schematic perspective view of a portion of an embodiment of a transfer tool including polymeric strands and ribbons, wherein the transfer tool is in an extended state to retain a triagonal prism shaped particle.

In the example of FIG. 5, which is not intended to be limiting, a portion of an array 200 is shown that includes a net-like array 214 made from polymeric strands 204, 204' extending along the x-direction and thicknesses 204c, 204c' extending along the z-direction. The net-like array includes a first "top" major surface 220 and a second "bottom" major surface 221 opposite the first major surface 220. The polymeric strands 204, 204' are bonded together at flexible bond regions 216, which create an array of apertures 215.

In the embodiment of FIG. 5, the first major surface 220 of the polymeric strand 204' is attached at various points to a minor surface 224 of a polymeric ribbon 202. The polymeric ribbon 202 has a thickness 202b and a height 202c extending along the z-direction above a flexible, net-like array 214 formed in the x-y plane by the polymeric strands 204, 204'. The polymeric ribbon 202 further includes a first major surface 203 and an opposed second major surface 205.

When the polymeric strands 204, 204' (or the polymeric ribbon 202, or both) are stretched along the y-direction to form the stretched array 200, the bond regions 216 bend and flex to enlarge the minimum dimensions of the apertures 215. The minimum dimensions of the apertures 215 bounded by successive bond regions 216 and the sides of the strands 204, 204' and the ribbons 202 increases sufficiently in size to accept a shaped particle 300 (for example, a shaped abrasive grain) that falls onto the first major surface 220 of the stretched array 200.

In the embodiment of FIG. 5, the shaped grain 300 is a uniform triangular prism. When the array 200 is in an extended or stretched state as shown in FIG. 5, in one example preferred orientation one vertex 350 of the prism 300 extends into the aperture 215 and protrudes along the z-direction below the second major surface 221 of the net-like array 214. A side 352 of the prism 300 opposite the vertex 350 rests against the first major surface 203 of the polymeric ribbon 202. The prism 300 thus protrudes and extends along the z-direction above the first major surface 220 of the net-like array 214, and the side 352 of the prism 300 opposite the vertex 352 is substantially parallel to the first major surface 220 of the net-like array 214.

When the array 200 is returned to a relaxed state (not shown in FIG. 5), the polymeric strands 204, 204' tighten and the bond regions 216 return to at least substantially their original shape, which reduces the minimum dimensions of the apertures 215. The relaxation of the bond regions 216 causes the strands 204, 204' and the first major surface of the ribbon 202 to tighten and press against the opposed substantially flat sides 354, 356 of the prism 300, which sufficiently frictionally retains and "locks in" the prism 300 in the aperture 215 in the preferred orientation to allow transfer of the particle-loaded array to a subsequent processing step. In some embodiments, the ribbon 202 can assist in restraining particles in the preferred orientation when the array 200 is in the relaxed state.

However, if a shaped particle 300 falls onto the first major surface 220 of the net-like array 214 when the array is unstretched, the minimum dimension of the apertures 215 bounded by successive bond regions 216 and the sides of the polymeric strands 204, 204' and ribbons 202 is sufficiently small such that the vertex 350 of the shaped particle cannot readily enter the apertures 215. Instead, the flat sides 354, 356 of the shaped particle 300 rest on at least one of the first major surface 220 of the array 214, or on the second major surface 225 of the ribbon 202.

In one embodiment, the particle loaded transfer tool 200 of FIG. 5 with "locked in" particles in the preferred orientation may be applied to a particle-adherent surface on a backing such that the side 352 of the prism-shaped particles 300 contacts the particle-adherent surface and the vertex 350 of the particles 300 points upward and away from the particle-adherent surface. The transfer tool remains intact in the final article as a reinforcing scrim to support and maintain the predetermined orientation of the locked in particles on the particle-adherent surface. In another embodiment, the particle-loaded transfer tool 200 may again be stretched along the y-direction to increase the minimum dimensions of the apertures and release the prism-shaped particles 300 such that the particles 300 can be removed from the transfer tool by gravity, vacuum, or both. The released particles transfer to the particle adherent surface in a predetermined orientation such that the sides 352 of the particles 300 contact and become adhered to the particle adherent surface and the vertices 350 of the particles 300 point upward and away from the particle adherent surface.

If the particles 300 are abrasive particles, they should have sufficient hardness and surface roughness to function as abrasive particles in abrading processes. Preferably, the abrasive particles have a Mohs hardness of at least 4, at least 5, at least 6, at least 7, or even at least 8. Exemplary abrasive particles shaped ceramic abrasive particles or shaped abrasive composite particles and combinations thereof. Examples of suitable abrasive particles include, but are not limited to, fused aluminum oxide; heat-treated aluminum oxide; white fused aluminum oxide; ceramic aluminum oxide materials such as those commercially available under the trade designation 3M CERAMIC ABRASIVE GRAIN from 3M Company, St. Paul, Minn.; brown aluminum oxide; blue aluminum oxide; silicon carbide (including green silicon carbide); titanium diboride; boron carbide; tungsten carbide; garnet; titanium carbide; diamond; cubic boron nitride; garnet; fused alumina zirconia; iron oxide; chromia; zirconia; titania; tin oxide; quartz; feldspar; flint; emery; sol-gel-derived abrasive particles (e.g., including shaped and crushed forms); and combinations thereof. Further examples include shaped abrasive composites of abrasive particles in a binder matrix, such as those described in U.S. Pat. No. 5,152,917 (Pieper et al.).

Examples of sol-gel-derived abrasive particles from which the abrasive particles can be isolated, and methods for their preparation can be found, in U.S. Pat. No. 4,314,827 (Leitheiser et al.); U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the abrasive particles could comprise abrasive agglomerates such, for example, as those described in U.S. Pat. No. 4,652,275 (Bloecher et al.) or U.S. Pat. No. 4,799,939 (Bloecher et al.).

In some embodiments, the abrasive particles may be surface-treated with a coupling agent (e.g., an organosilane coupling agent) or other physical treatment (e.g., iron oxide or titanium oxide) to enhance adhesion of the crushed abrasive particles to the binder. The abrasive particles may be treated before combining them with the binder, or they may be surface treated in situ by including a coupling agent to the binder. Preferably, the abrasive particles (and especially the abrasive particles) include ceramic abrasive particles such as, for example, sol-gel-derived polycrystalline alpha alumina particles. Ceramic abrasive particles composed of crystallites of alpha alumina, magnesium alumina spinel, and a rare earth hexagonal aluminate may be prepared using sol-gel precursor alpha alumina particles according to methods described in, for example, U.S. Pat. No. 5,213,591 (Celikkaya et al.) and U.S. 2009/0165394 A1 (Culler et al.) and 2009/0169816 A1 (Erickson et al.). Further details concerning methods of making sol-gel derived abrasive particles can be found in, for example, U.S. Pat. No. 4,314,827 (Leitheiser) U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and in U.S. 2009/0165394 A1 (Culler et al.).

In some preferred embodiments, useful abrasive particles (especially in the case of the abrasive particles) may be shaped abrasive particles can be found in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina abrasive particles that have been formed in a specific shape, then crushed to form shards that retain a portion of their original shape features. In some embodiments, shaped alpha alumina particles are precisely-shaped (i.e., the particles have shapes that are at least partially determined by the shapes of cavities in a production tool used to make them. Details concerning such abrasive particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. Nos. 2012/0227333 (Adefris et al.); 2013/0040537 (Schwabel et al.); and 2013/0125477 (Adefris). One particularly useful precisely-shaped abrasive particle shape is that of a truncated triangular pyramid with sloping sidewalls described above, which is described in the above cited references.

Surface coatings on the abrasive particles may be used to improve the adhesion between the abrasive particles and a binder material, or to aid in deposition of the abrasive particles. In one embodiment, surface coatings as described in U.S. Pat. No. 5,352,254 (Celikkaya) in an amount of 0.1 to 2 percent surface coating to abrasive particle weight may be used. Such surface coatings are described in U.S. Pat. No. 5,213,591 (Celikkaya et al.); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz et al.).

Additionally, the surface coating may prevent shaped abrasive particles from capping. Capping describes the phenomenon where metal particles from the workpiece being abraded become welded to the tops of the abrasive particles. Surface coatings to perform the above functions are known to those of skill in the art.

In some embodiments, the abrasive particles may be selected to have a length and/or width in a range of from 0.1 micrometers to 3.5 millimeters (mm), more typically 0.05 mm to 3.0 mm, and more typically 0.1 mm to 2.6 mm, although other lengths and widths may also be used. The abrasive particles may be selected to have a thickness in a range of from 0. (micrometer to 1.6 mm, more typically from 1 micrometer to 1.2 mm, although other thicknesses may be used. In some embodiments, abrasive particles may have an aspect ratio (length to thickness) of at least 2, 3, 4, 5, 6, or more.

A grinding aid is a material that has a significant effect on the chemical and physical processes of abrading, which results in improved performance. Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, and iron titanium.

Other miscellaneous grinding aids include sulfur, organic sulfur compounds, graphite, and metallic sulfides. A combination of different grinding aids may be used, and in some instances this may produce a synergistic effect.

Grinding aids can be particularly useful in coated abrasives. In coated abrasive articles, the grinding aid is typically used in a supersize coat, which is applied over the surface of the abrasive particles. Sometimes, however, the grinding aid is added to the size coat. Typically, the amount of grinding aid incorporated into coated abrasive articles are about 50-300 grams per square meter (g/m$^2$), preferably about 80-160 g/m$^2$.

Further details regarding coated abrasive articles and methods of their manufacture can be found, for example, in U.S. Pat. No. 4,734,104 (Broberg); U.S. Pat. No. 4,737,163 (Larkey); U.S. Pat. No. 5,203,884 (Buchanan et al.); U.S. Pat. No. 5,152,917 (Pieper et al.); U.S. Pat. No. 5,378,251 (Culler et al.); U.S. Pat. No. 5,436,063 (Follett et al.); U.S. Pat. No. 5,496,386 (Broberg et al.); U.S. Pat. No. 5,609,706 (Benedict et al.); U.S. Pat. No. 5,520,711 (Helmin); U.S. Pat. No. 5,961,674 (Gagliardi et al.), and U.S. Pat. No. 5,975,988 (Christianson).

Figure 6:
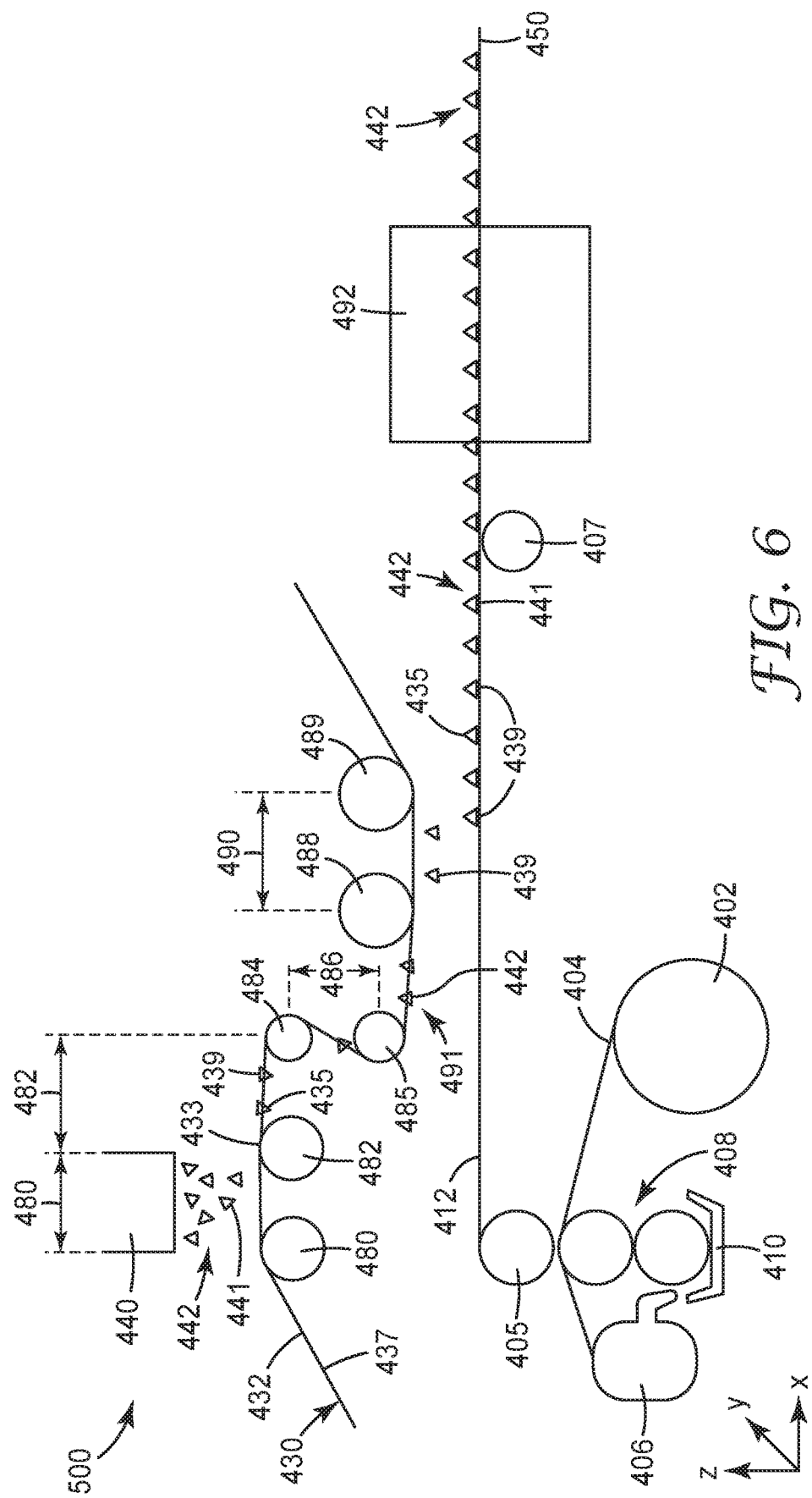
FIG. 6 is a schematic diagram of a system and apparatus for using the transfer tools of the present disclosure to deposit shaped particles on a target substrate in a predetermined orientation.

Referring now to FIG. 6, any of the above-described transfer apparatuses 10, 100, 200 may be used as part of an apparatus 500 for producing a particle-bearing substrate 450. The apparatus 500 includes an unwind roller 402 for supplying a web-like substrate 404, and a delivery system 406 and an applicator 408 for disposing (e.g., coating) a material 410 to form a particle-adherent layer (e.g. in the form of a surface coating of suitable material) on a major surface 412 of the substrate 404. The substrate 404 moves along the machine direction (x-direction) between rollers 405, 407.

Any substrate 404 with any suitable particle-adherent major surface 412 may be used. The particle-adherent surface does not necessarily have to be coated as a separate layer onto the substrate 404. For example, a major surface 412 of substrate 404 (or a considerable thickness of the substrate, or even the entire substrate) might be made of a material that can be sufficiently softened (e.g., by heating) to be particle-adherent. At least major surface 412 of such a substrate may then be heated prior to the substrate being brought into proximity to the transfer tool 430 so that particles can be transferred onto the softened, particle-adherent surface 412 of the substrate.

As used herein, in various embodiments, which are not intended to be limiting, "proximity" signifies a distance of less than about 1 cm, or less than about 0.5 cm, and in some embodiments includes actual contact.

The substrate 404 may be selected from any material with a particle-adherent surface 412, or which can have such a particle adherent-surface 412 imparted thereto (whether by coating an additional layer on the substrate, by surface-treating the substrate, by heating the substrate, and so on). The substrate 404 may be made of a single layer or may include multiple layers of material. In various embodiments, the substrate 404 can be chosen from a cloth, paper, film, nonwoven, a scrim, and combinations thereof.

In various embodiments, useful substrates 404, also referred to herein as backings, have a thickness of about 0.02 to about 5 millimeters, from about 0.05 to about 2.5 millimeters, or from about 0.1 to about 0.4 millimeter. Exemplary backings include, but are not limited to, dense nonwoven fabrics (for example, including needletacked, meltspun, spunbonded, hydroentangled, or meltblown nonwoven fabrics), knitted, stitchbonded, and/or woven fabrics; scrims; polymer films; treated versions thereof and combinations of two or more of these materials.

Fabric backings can be made from any known fibers, whether natural, synthetic or a blend of natural and synthetic fibers. Examples of useful fiber materials include fibers or yarns including polyester (for example, polyethylene terephthalate), polyamide (for example, hexamethylene adipamide, polycaprolactam), polypropylene, acrylic (formed from a polymer of acrylonitrile), cellulose acetate, polyvinylidene chloride-vinyl chloride copolymers, vinylchloride-acrylonitrile copolymers, graphite, polyimide, silk, cotton, linen, jute, hemp, or rayon. Useful fibers may be of virgin materials or of recycled or waste materials reclaimed from garment cuttings, carpet manufacturing, fiber manufacturing, or textile processing, for example. Useful fibers may be homogenous or a composite such as a bicomponent fiber (for example, a co-spun sheath-core fiber). The fibers may be tensilized and crimped, but may also be continuous filaments such as those formed by an extrusion process.

The strength of the backing should be sufficient to resist tearing or other damage during abrading processes. The thickness and smoothness of the backing should also be suitable to provide the desired thickness and smoothness of the coated abrasive article; for example, depending on the intended application or use of the coated abrasive article. The fabric backing may have any basis weight; typically, in a range of from 100 to 1000 grams per square meter (gsm), more typically 450 to 600 gsm, and even more typically 450 to 575 gsm.

To promote adhesion of binder resins to the fabric backing, one or more surfaces of the backing may be modified by known methods including corona discharge, ultraviolet light exposure, electron beam exposure, flame discharge, and/or scuffing.

In some embodiments, the substrate 404 includes a fiber scrim. Suitable fiber scrims may include woven, and knitted cloths, for example, which may include inorganic and/or organic fibers. For example, the fibers in the scrim may include wire, ceramic fiber, glass fiber (for example, fiberglass), and organic fibers (for example, natural and/or synthetic organic fibers). Examples of organic fibers include cotton fibers, jute fibers, and canvas fibers. Examples of synthetic fibers include nylon fibers, rayon fibers, polyester fibers, and polyimide fibers).

If a particle-adherent layer (e.g., a coating) is used to provide particle-adherent surface 412, the layer may be of any suitable composition. For example, such a coating may be a "make coat" as is commonly referred to in the abrasive arts. Such a make coat may be e.g. a phenolic resin or any of the other make coat compositions that are known. A make coat applicator 405 can be, for example, a coater, a roll coater, a spray system, or a rod coater.

In various embodiments, the make coat layer is formed by at least partially curing a make layer precursor that is a curable tacky adhesive composition according to the present disclosure. The tacky curable adhesive composition includes resole phenolic resin and an aliphatic tack modifier, and the amount of resole phenolic resin includes from 60 to 98 weight percent of the combined weight of the resole phenolic resin and the aliphatic tack modifier.

Phenolic resins are generally formed by condensation of phenol and formaldehyde, and are usually categorized as resole or novolac phenolic resins. Novolac phenolic resins are acid catalyzed and have a molar ratio of formaldehyde to phenol of less than 1:1. Resole (also resol) phenolic resins can be catalyzed by alkaline catalysts, and the molar ratio of formaldehyde to phenol is greater than or equal to one, typically between 1.0 and 3.0, thus presenting pendant methylol groups. Alkaline catalysts suitable for catalyzing the reaction between aldehyde and phenolic components of resole phenolic resins include sodium hydroxide, barium hydroxide, potassium hydroxide, calcium hydroxide, organic amines, and sodium carbonate, all as solutions of the catalyst dissolved in water.

Resole phenolic resins are typically coated as a solution with water and/or organic solvent (e.g., alcohol). Typically, the solution includes about 70 percent to about 85 percent solids by weight, although other concentrations may be used.

Phenolic resins are well-known and readily available from commercial sources. Examples of commercially available resole phenolic resins useful in practice of the present disclosure include those marketed by Durez Corporation under the trade designation VARCUM (e.g., 29217, 29306, 29318, 29338, 29353); those marketed by Ashland Chemical Co. of Bartow, Fla. under the trade designation AEROFENE (e.g., AEROFENE 295); and those marketed by Kangnam Chemical Company Ltd. of Seoul, South Korea under the trade designation PHENOLITE (e.g., PHENOLITE TD-2207).

In addition to the resole phenolic resin, the curable tacky binder precursor contains an aliphatic tack modifier. The curable tacky binder precursor contains from 60 to 98 weight percent, or 90 to 98 weight, percent of the resole phenolic resin based on the combined weight of the resole phenolic resin and the aliphatic tack modifier. Accordingly, the curable tacky binder precursor composition contains from 2 to 40 weight percent, or 2 to 10 weight percent, of the aliphatic tack modifier, based on the combined weight of the resole phenolic resin and the aliphatic tack modifier. The aliphatic tack modifier has the unexpected effect of modifying the tackiness of the resole phenolic resin, thereby resulting in the curable tacky binder precursor composition.

Examples of suitable aliphatic tack modifiers include: aliphatic rosins and aliphatic derivatives thereof; aliphatic liquid hydrocarbon resins; aliphatic solid hydrocarbon resins; liquid natural rubber; hydrogenated polybutadiene; polytetramethylene ether glycol; isooctyl acrylate acrylic acid copolymers as described in U.S. Pat. No. 4,418,120 (Kealy et. al; and acrylic zwitterionic amphiphilic polymers as described in U.S. 2014/0170362 A1 (Ali et al.). Combinations of more than one resole phenolic resin and/or more than one aliphatic tack modifier may be used if desired.

Useful aliphatic rosins and aliphatic derivatives thereof include, for example, aliphatic esters of natural and modified rosins and the hydrogenated derivatives thereof (e.g., a glycerol ester of tall oil rosin marketed as PERMALYN 2085 and a glycerol ester of hydrogenated gum rosin marketed as FORAL 5-E, both available from Eastman Chemical Company, and an aliphatic rosin ester dispersion obtained as AQUATAC 6085 from Arizona Chemical, Jacksonville, Fla.), hydrogenated rosin resins (e.g., partially hydrogenated rosin is produced by Eastman Chemical Company as STAYBELITE-E and completely hydrogenated rosin is branded as FORAL AX-E), dimerized rosin resins (e.g., POLY-PALE partially dimerized rosin is a partially dimerized rosin product offered by Eastman Chemical Company), and aliphatic modified rosin resins (e.g., maleic anhydride modified rosin resins marketed as LEWISOL 28-M or LEWISOL 29-M).

Examples of aliphatic hydrocarbon resin tackifiers include tackifiers derived from liquid C5 feedstock by Lewis acid catalyzed polymerization, and hydrogenated derivatives thereof. Commercially available aliphatic hydrocarbon resin tackifiers include those marketed by Eastman Chemical Company, Kingsport, Tenn., under the trade designations PICCOTAC 1020, PICCOTAC 1095, PICCOTAC 1098, PICCOTAC 1100, and PICCOTAC 1115, and in hydrogenated forms as EASTOTAC H-100E, EASTOTAC H-115E and EASTOTAC H-130E.

Liquid natural rubber is a modified form of natural rubber with a shorter polymeric chain. Many liquid natural rubbers are commercially available. Examples include liquid natural rubbers marketed by DPR industries, Coatesville, Pa., under the trade designations DPR 35, DPR 40, DPR 75, and DPR 400. Hydrogenated polybutadienes are available commercially; for example, as KRATON LIQUID L1203 from Kraton Polymers US LLC, Houston, Tex., and as POLY-TAIL from Mitsubishi International Polymer/Trade Corporation, Newark, N.J. Polytetramethylene ether glycol (PTMEG) is a waxy, white solid that melts to a clear, colorless viscous liquid near room temperature. PTMEG is produced by the catalyzed polymerization of tetrahydrofuran. Exemplary polytetramethylene ether glycols include those available under the trade designation TETRATHANE from Invista, Waynesboro, Va. (e.g., TETRATHANE 250, 650, 1000, 1400, 1800, 2000 and 2900). Useful copolymers of isooctyl acrylate and acrylic acid are described in U.S. Pat. No. 4,418,120 (Kealy et. al). Examples include copolymers of isooctyl acrylate (IOA) and acrylic acid (AA) wherein the weight ratio of IOA:AA is in the range of from 93:7 to 97:3; more preferably abut 95:5.

Useful aliphatic zwitterionic amphiphilic acrylic polymers are described in U.S. 2014/0170362 A1 (Ali et al.). Examples of useful zwitterionic amphiphilic acrylic polymers include the polymerized product of an anionic monomer that is acrylic acid, methacrylic acid, a salt thereof, or a blend thereof; an acrylate or methacrylate ester of an alcohol having between 8 and 12 carbons; and a cationic monomer that is an acrylate or methacrylate ester having alkylammonium functionality. Optionally, one or more additional monomers are included in the zwitterionic polymers of the invention. In some embodiments the anionic monomer is acrylic or methacrylic acid, the acid is converted either before or after polymerization to a corresponding carboxylate salt by neutralization. In some embodiments, the acrylic acid, methacrylic acid, or a salt thereof is a mixture of two or more thereof. In some embodiments, the acrylate or methacrylate ester is a mixture of two or more such esters; in some embodiments, the cationic monomer is a mixture of two or more such cationic monomers.

In some embodiments, the polymerized product of acrylic acid, methacrylic acid, a salt thereof or blend thereof is present in the zwitterionic polymer at about 0.2 wt % to 5 wt % based on the total weight of the polymer, or at about 0.5 wt % to 5 wt % of the zwitterionic polymer, or in various intermediate levels such as 0.3 wt %, 0.4 wt %, 0.6 wt %, 0.7 wt %, and all other such individual values represented by 0.1 wt % increments between 0.2 and 5.0 wt %, and in ranges spanning between any of these individual values in 0.1 wt % increments, such as 0.2 wt % to 0.9 wt %, 1.2 wt % to 3.1 wt %, and the like.

In some embodiments, the acrylate or methacrylate ester of an alcohol having between 8 and 12 carbons includes acrylate or methacrylate esters of linear, branched, or cyclic alcohols. While not intended to be limiting, examples of alcohols useful in the acrylate or methacrylate esters include octyl, isooctyl, nonyl, isononyl, decyl, undecyl, and dodecyl alcohol. In some embodiments, the alcohol is isooctyl alcohol. In some embodiments, the acrylate or methacrylate ester of an alcohol having between 8 and 12 carbons is a mixture of two or more such compounds. In some embodiments, polymerized product of the acrylate or methacrylate ester of an alcohol having between 8 and 12 carbons is present in the zwitterionic polymer at about 50 wt % to 95 wt % of the total weight of the polymer, or at about 60 wt % to 90 wt % of the total weight of the polymer, or at about 75 wt % to 85 wt % of the total weight of the polymer, or in various intermediate levels such as 51 wt %, 52 wt %, 53 wt %, 54 wt %, and all other such values individually represented by 1 wt % increments between 50 wt % and 95 wt %, and in any range spanning between any of these individual values in 1 wt % increments, for example ranges such as about 54 wt % to 81 wt %, about 66 wt % to 82 wt %, about 77 wt % to 79 wt. 20%, and the like.

In some embodiments, the cationic monomer is an acrylate or methacrylate ester including an alkylammonium functionality. In some embodiments, the cationic monomer is a 2-(trialkylammonium) ethyl acrylate or a 2-(trialkylammonium)ethyl methacrylate. In such embodiments, the nature of the alkyl groups is not particularly limited; however, cost and practicality limit the number of useful embodiments. In embodiments, the 2-(trialkylammonium) ethyl acrylate or 2-(trialkylammonium) ethyl methacrylate is formed by the reaction of 2-(dimethylamino) ethyl acrylate or 2-(dimethylamino) ethyl methacrylate with an alkyl halide; in such embodiments, at least two of the three alkyl groups of the 2-(trialkylammonium) ethyl acrylate or 2-(trialkylammonium)ethyl methacrylate are methyl. In some such embodiments, all three alkyl groups are methyl groups. In other embodiments, two of the three alkyl groups are methyl and the third is a linear, branched, cyclic, or alicyclic group having between 2 and 24 carbon atoms, or between 6 and 20 carbon atoms, or between 8 and 18 carbon atoms, or 16 carbon atoms. In some embodiments, the cationic monomer is a mixture of two or more of these compounds.

The anion associated with the ammonium functionality of the cationic monomer is not particularly limited, and many anions are useful in connection with various embodiments of the invention. In some embodiments, the anion is a halide anion, such as chloride, bromide, fluoride, or iodide; in some such embodiments, the anion is chloride. In other embodiments the anion is $BF_4{-}$, $-N(SO_2CF_3)_2$, $-O_3SCF_3$, or $-O_3SC_4F_9$. In other embodiments, the anion is methyl sulfate. In still other embodiments, the anion is hydroxide. In some embodiments, the one or more cationic monomers includes a mixture of two or more of these anions. In some embodiments, polymerization is carried out using 2-(dimethylamino) ethyl acrylate or 2-(dimethylamino)ethyl methacrylate, and the corresponding ammonium functionality is formed in situ by reacting the amino groups present within the polymer with a suitable alkyl halide to form the corresponding ammonium halide functionality. In other embodiments, the ammonium functional monomer is incorporated into the cationic polymer and then the anion is exchanged to provide a different anion. In such embodiments, ion exchange is carried out using any of the conventional processes known to and commonly employed by those having skill in the art.

In some embodiments, the polymerized product of the cationic monomer is present in the zwitterionic polymer at about 2 wt % to 45 wt % based on the total weight of the zwitterionic polymer, or at about 2 wt % to 35 wt % of the zwitterionic polymer, or at about 4 wt % to 25 wt % of the zwitterionic polymer, or at about 6 wt % to 15 wt % of the zwitterionic polymer, or at about 7 wt % to 10 wt % of the zwitterionic polymer, or in various intermediate levels such as 3 wt %, 5 wt %, 6 wt %, 8 wt %, and all other such individual values represented by 1 wt % increments between 2 wt % and 45 wt %, and in any range spanning these individual values in 1 wt % increments, such as 2 wt % to 4 wt %, 7 wt % to 38 wt %, 20 wt % to 25 wt %, and the like.

The curable tacky binder precursor material may also contain additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the preferred properties. The coupling agents can improve adhesion to the abrasive particles and/or filler. The binder chemistry may be thermally cured, radiation cured or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.).

The curable tacky binder precursor material may also contain filler materials or grinding aids, typically in the form of a particulate material. Typically, the particulate materials are inorganic materials. Examples of useful fillers for this disclosure include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

The size layer precursor may be the same as or different than the make layer precursor. Examples of suitable thermosetting resins that may be useful for the size layer precursor include, for example, free-radically polymerizable monomers and/or oligomers, epoxy resins, acrylic resins, urethane resins, phenolic resins, urea-formaldehyde resins, melamine-formaldehyde resins, aminoplast resins, cyanate resins, or combinations thereof.

Useful binder precursors include thermally curable resins and radiation curable resins, which may be cured, for example, thermally and/or by exposure to radiation. The size layer precursor may also be modified various additives (e.g., as discussed above with respect to the make coat precursor). Catalysts and/or initiators may be added to thermosetting resins; for example, according to conventional practice and depending on the resin used.

In some embodiments, heat energy is applied to advance curing of the thermosetting resins (e.g., size layer precursor or curable tacky binder material precursor compositions according to the present disclosure). However, other sources of energy (e.g., microwave radiation, infrared light, ultraviolet light, visible light, may also be used). The selection will generally be dictated by the particular resin system selected.

Referring to FIG. 6, a web-like transfer tool 430 includes an extensible flexible polymeric scrim 432 that includes a net-like arrangement of elongate polymer strands. As shown in FIGS. 3-5, the strands in the flexible scrim 432 are periodically joined together at flexible bond regions, which creates a corresponding array of apertures therebetween that can be mechanically opened and closed by stretching the flexible scrim 432.

In the embodiment of FIG. 6, the flexible scrim 432 moves along the machine direction (x-direction) and enters a particle deposition zone 480 in which the flexible scrim is unstretched along the cross-machine direction (y-direction), and apertures in the scrim have a first minimum dimension. In the particle deposition zone 480 a particle source 440 above the flexible scrim 432 deposits shaped abrasive particles 442 on the first major surface 433 of the flexible scrim 432. In the non-limiting example of FIG. 6, the shaped abrasive particles 442 are triangular prisms with opposed triangular faces 441.

The particle source 440 may be of any suitable design, and in some embodiments will be at least as wide (in the crossweb or y-direction) as the transfer tool 430 to supply particles 442 across the entire width of the flexible scrim 432. Whatever the particular design, particle source 440 will be positioned sufficiently far above the scrim 432 such that particles 442 will be deposited substantially evenly on the major surface 433 of the scrim 432.

In the particle deposition zone 480, the apertures in the flexible scrim 432 are sufficiently small such that the particle do not enter the apertures, but remain in random orientations on the first major surface 433 of the flexible scrim 432. In the embodiment of FIG. 6, the triangular prisms will in most cases remain in a position in which their opposed triangular faces 441 are substantially parallel to the first major surface 433.

The flexible scrim 432 moves along the machine direction (x-direction) and enters a first elongation zone 482 where the scrim 432 is stretched in the cross-web direction (y-direction). The flexible scrim 432 may be stretched by any suitable means such as for example, by attaching clips to the edges of the scrim and running the clips along diverging rails, by moving the flexible scrim around an arrangement of suitably shaped disks, and the like. The stretching of the scrim 432 flexes and bends the flexible bond regions, which increases the minimum dimension of the apertures between the strands in the stretched scrim 432 from the first minimum dimension to a second larger minimum dimension.

In the first elongation zone 482, the substantially all (at least 90%, or at least 95%, or at least 99%) of the particles 442 on the first major surface 433 of the stretched scrim 432 fall into the apertures of the scrim such that one vertex 435 thereof extends below a second major surface 437 of the scrim and the opposed triangular faces 441 are normal to the first major surface 433. An edge of the particles 439 opposite the vertex 435 extends substantially parallel to the first major surface of the 433 of the extended scrim such that substantially of the particles 442 are in a preferred orientation within the expanded apertures of the scrim 432. The scrim 432 may optionally be vibrated in the first elongation zone 482 to assist movement of the particles 442 into the expanded apertures of the stretched scrim 432.

As the scrim 432 extends between rollers 484, 485 and enters a relaxation zone 486, the scrim 432 is relaxed (or allowed to relax) in the cross machine direction (y-direction), which allows the bond regions to return to their original shapes and reduces the size of the apertures to the first minimum dimension, which frictionally retains the particles 442 in the preferred orientation within the smaller apertures. In the relaxation zone 486 the particles 442 reside in the apertures between the strands of the scrim 432 and the opposed major surfaces of the particles are frictionally engaged therebetween to form a loaded flexible scrim 491.

The loaded flexible scrim 491 traverses rollers 488, 489 and enters a second elongation zone 490, wherein the loaded scrim 491 is positioned relative to the particle adherent surface 412. In the second elongation zone 490, the flexible scrim 432 is again stretched along the cross machine (y-direction), which again bends the bond regions and expands the apertures to the second minimum dimensions to release the particles 442 from the loaded scrim 491. In the second elongation zone 490 the particles 442 release from the expanded apertures in the loaded scrim 491 and transfer to the particle adherent surface 412 of the substrate 404 in a predetermined orientation. The loaded scrim 491 is sufficiently close to the particle adherent surface 412 such that substantially all (at least 90%, or at least 95%, or at least 99%) of the particles 442 adhere to the surface 412 in a preferred orientation In the embodiment of FIG. 6, which is not intended to be limiting, the preferred orientation includes the edge 439 of each particle 442 contacting the particle adherent surface 412 and the vertex 435 opposite the edge 439 extending upward and away from the particle adherent surface 412. The opposed triangular faces 441 are aligned normal to the particle adherent surface 412.

In another embodiment not shown in FIG. 6, the loaded flexible scrim 491 itself may be contacted with the particle adherent surface 412 after traversing the relaxation zone 486 such that the particles 442 retained therein contact the particle adherent surface 412 in the preferred orientation and the scrim 432 remains engaged with the particles 435 to become an integral reinforcing part of the final abrasive article.

After the transfer of particles 442 occurs in the elongation zone 490, the substrate 404 may e.g. be passed through a curing zone 492. The curing zone 492 includes an oven or any suitable device that imparts a thermal or UV exposure to fully cure or harden the particle-adherent material of the surface 412 of the substrate 404 to securely bind the particles 442 thereto in the preferred orientation to form a particle-bearing substrate 450. After the transfer of the particles 442 occurs in the second elongation zone 490, the transfer tool 430, which in the embodiment of FIG. 6 is an endless belt, recirculates to pick up an additional loading of particles 442.

The transfer tool 430 precisely transfers and positions each particle 442 onto the particle-adherent surface 412 of substrate 404, substantially reproducing the pattern of particles as present within the surface of the transfer tool 430 to form the particle-bearing substrate 450. The particle-bearing substrate 450 may then be e.g. wound, sheeted, converted, packaged, and so on, as desired.

For example, in some embodiments the particle bearing substrate may be converted to a coated abrasive article including additional layers such as, for example, an optional supersize layer that is superimposed on the abrasive layer, or a backing antistatic treatment layer may also be included, if desired.

Or, in another example embodiment, if surface 412 included a material that had been heated to be softened so as to be particle-adherent, the substrate 404 may be passed through a cooling device (which may be passive or active) to cool the material so that it hardens. There are many ways in which the securing of particles to surface 412 can be done. For example, a particle-adherent surface may be e.g. a photocurable or e-beam curable composition, in which case a suitable curing device can be used instead of, or in addition to, a thermal exposure.

In some embodiments, the particle bearing substrate 450 forms an abrasive article in which substantially all of the (at least 90%, or at least 95%, or at least 99%) of the particles 442 adhere to the surface 412 in a preferred orientation. In various embodiments, the particles 442 are adhered to the surface 412 in elongate rows extending along the longest direction of the substrate web 404 (also referred to the machine direction). In some embodiments, which are not intended to be limiting, the rows of particles 442 are about 1 micron to about 50 microns apart, or about 5 microns to about 30 microns, or about 10 microns to about 20 microns, or about 1 micron to about 5 microns, or about 1 micron to about 10 microns. In various embodiments, the rows of particles 442 may be offset from another, or also substantially aligned in rows along the cross-web direction normal to the machine direction. The particles 442 may occupy all or a portion of the surface 412 of the substrate web 404.

Abrasive articles according to the present disclosure are useful, for example, for abrading a workpiece. Such a method may include frictionally contacting an abrasive article with a surface of the workpiece, and moving at least one of the abrasive article and the surface of the workpiece relative to the other to abrade at least a portion of the surface of the workpiece. Methods for abrading with abrasive articles according to the present disclosure include, for example, snagging (i.e., high-pressure high stock removal) to polishing (e.g., polishing medical implants with coated abrasive belts; wherein the latter is typically done with finer grades (e.g., ANSI 220 and finer) of abrasive particles. The size of the abrasive particles used for a particular abrading application will be apparent to those skilled in the art.

Abrading may be carried out dry or wet. For wet abrading, the liquid may be introduced as a light mist to a complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Examples of workpieces include aluminum metal, carbon steels, mild steels (e.g., 1018 mild steel and 1045 mild steel), tool steels, stainless steel, hardened steel, titanium, glass, ceramics, wood, wood-like materials (e.g., plywood and particle board), paint, painted surfaces, and organic coated surfaces. The applied force during abrading typically ranges from about 1 to about 100 kilograms (kg), although other pressures can also be used.

The apparatus and methods of the present disclosure will now be further illustrated by the following non-limiting example.

Example

Figure 7A:
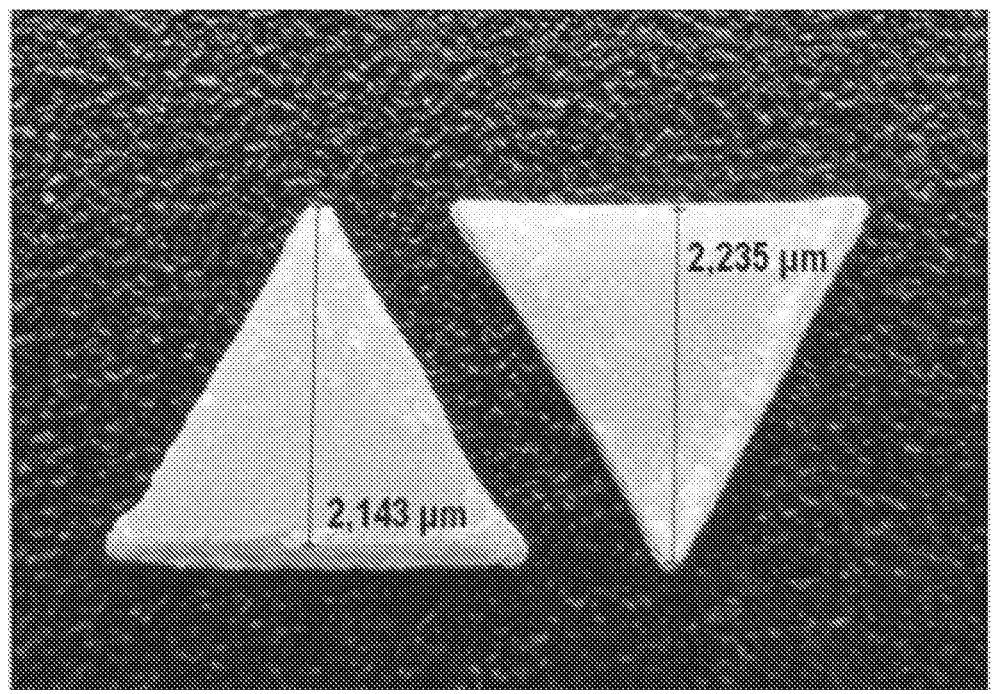
Figure 7B:
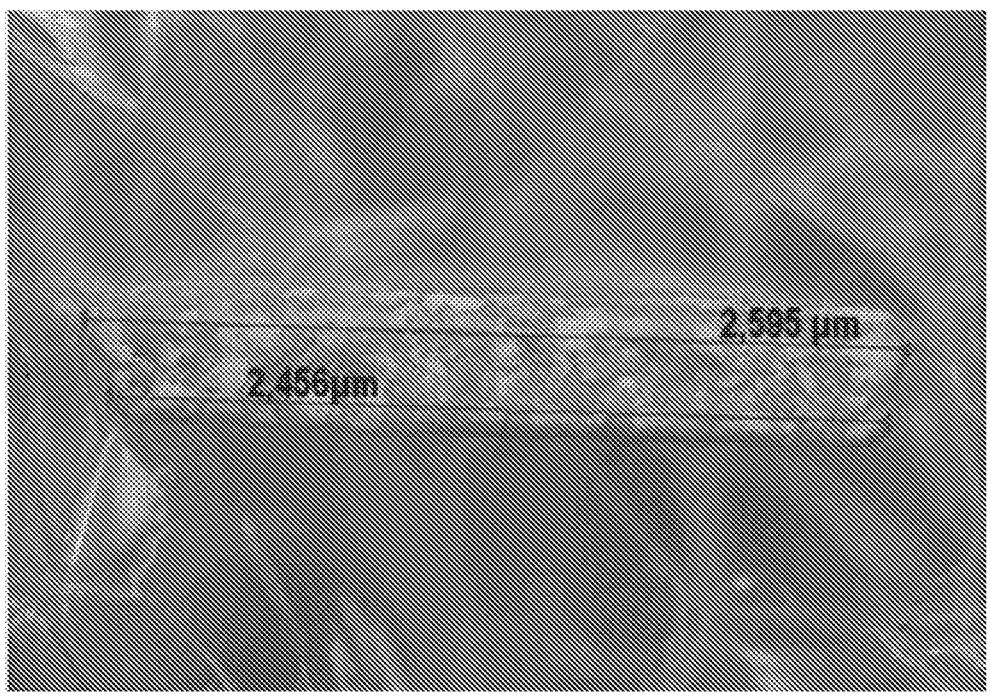
FIGS. 7B-7C are views of edges of the shaped abrasive grain.
Figure 7C:
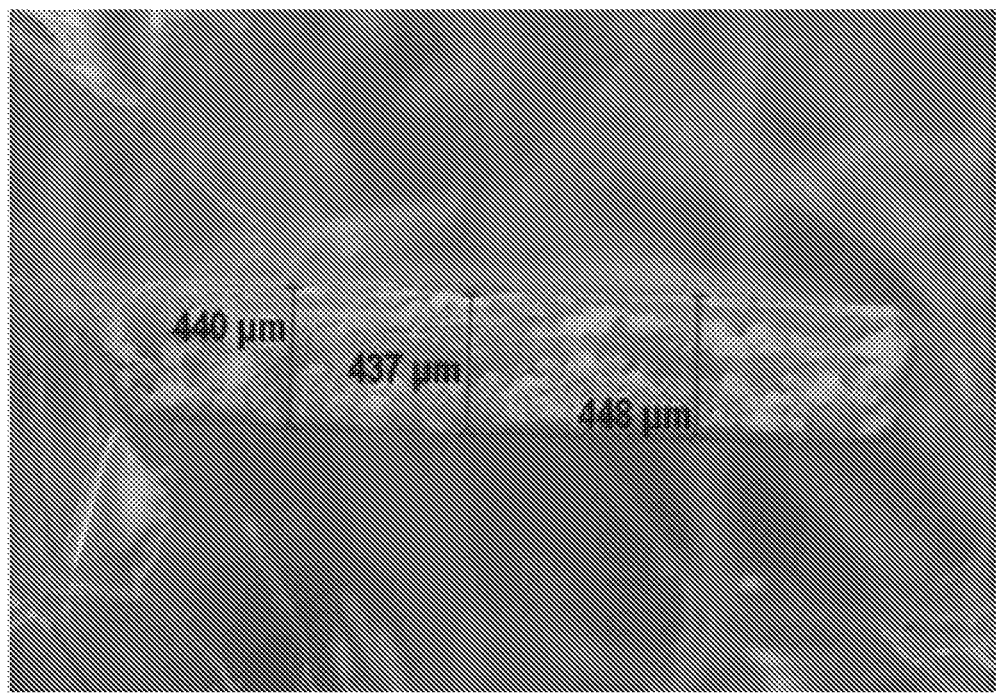

Coarse-grade precision triangle prism shaped abrasive grains are useful for titanium grinding, but orientation and placement of this large mineral has challenges. For example, the mineral takes on many standing angles and is prone to tip over on abrasive backings). The minerals had the shape and dimensions shown in FIGS. 7A-7C. The height and length of the mineral falls between about 2.1 mm to about 2.6 mm, and the thickness of the mineral is approximately 0.44 mm.

A co-extrusion die and process as generally described and depicted in Example 1 of patent application WO 2015131052 was used to make a netting to retain the shaped abrasive grains. Each of two extruder feeding cavities A and B were loaded with polypropylene obtained under the trade designation "PP3376" from Total Petrochemicals, Houston, Tex., which was dry blended at 90% with polypropylene obtained under the trade designation "F008F" from Braskem, Philadelphia, Pa. The polymeric strands were bonded together at periodic bond regions to form a net-like array of elongate hexagonal apertures.

Figure 8A:
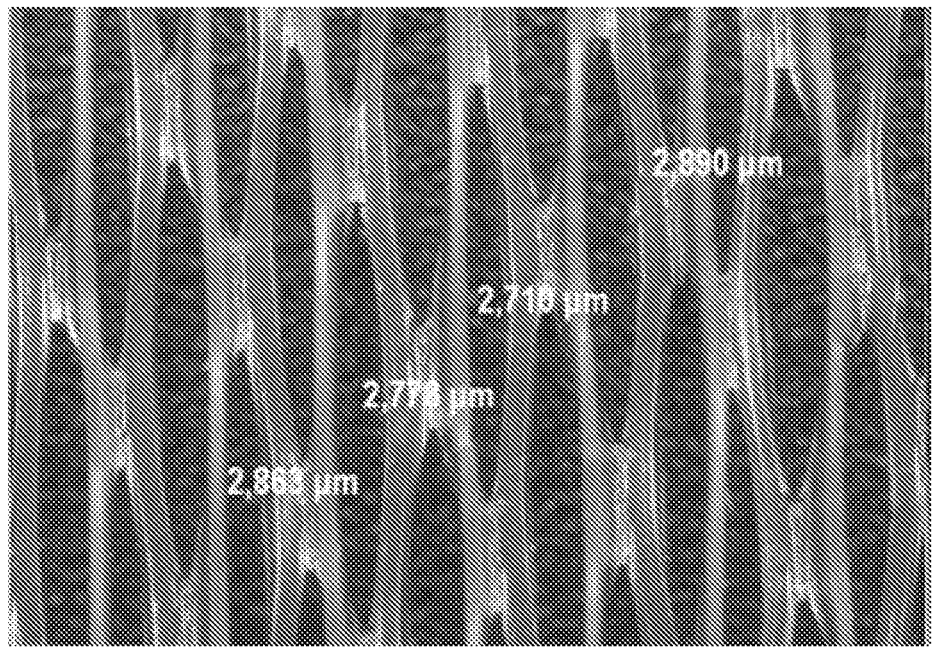
FIGS. 8A-8B are overhead views of a transfer tool used in the working example of the present disclosure, the transfer tool being in an unextended state.
Figure 8B:
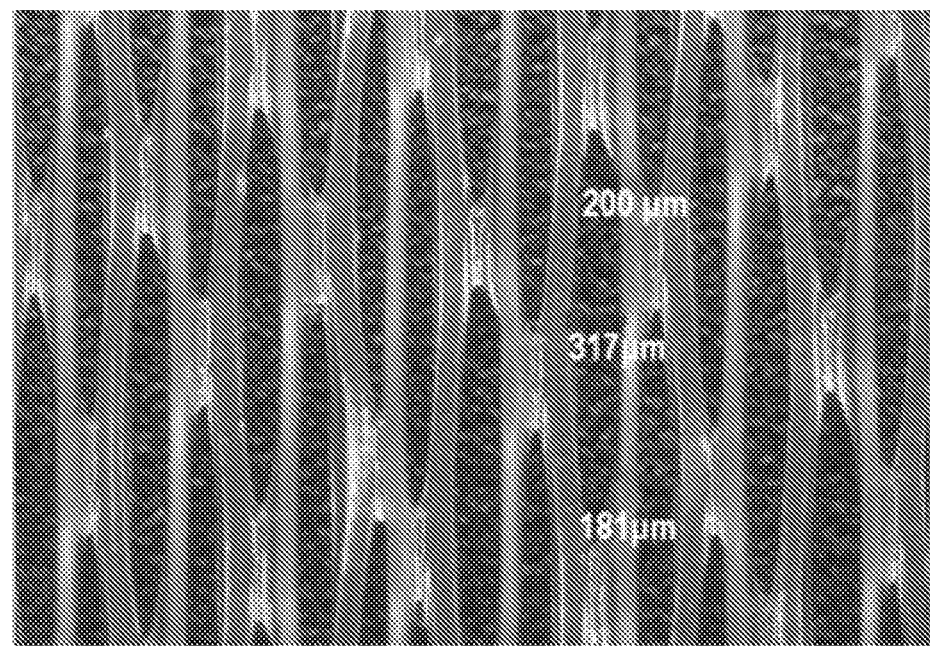
Figure 9A:
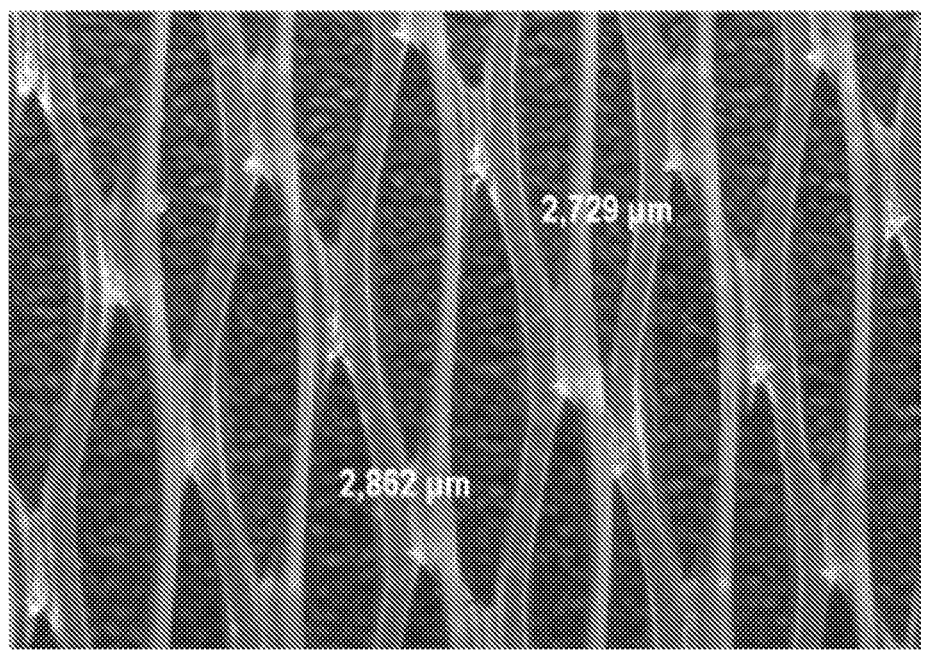
FIGS. 9A-9B are overhead views of a transfer tool used in the working example of the present disclosure, the transfer tool being in an extended state.
Figure 9B:
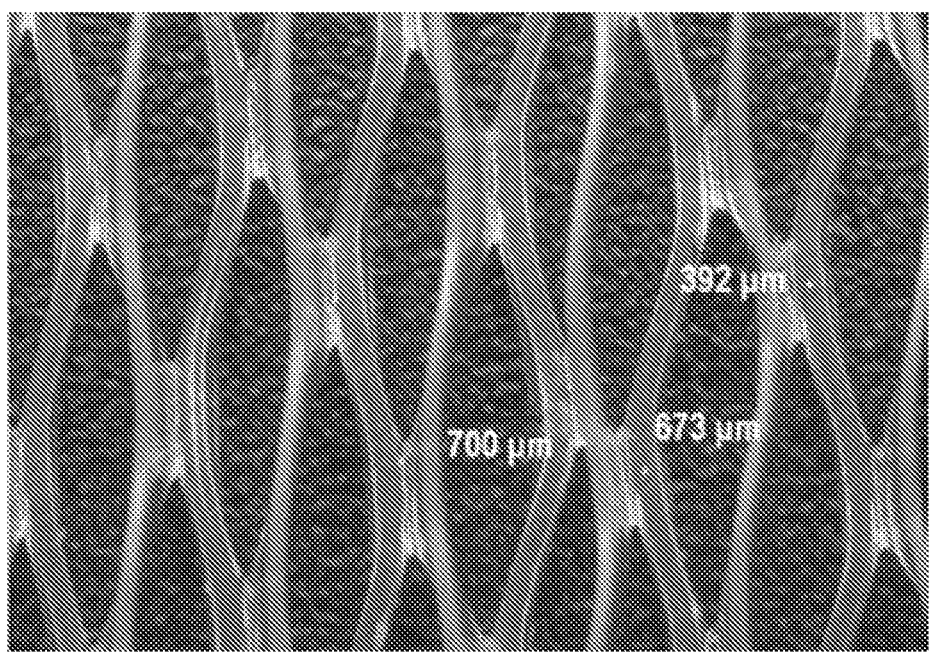

As shown in FIGS. 8A-8B, in a relaxed (unextended or unelongated) state, the apertures in the array had a length along the longest dimension of the web (referred to herein as the machine direction or the x-direction) of about 2710 µm to about 2890 µm, and a width along the cross-web direction (y-direction) of about 181 µm to about 317 µm. Referring to FIGS. 9A-9B, in a stretched or extended state the apertures in the array had a length of about 2729 µm to about 2862 µm, and a width of about 392 µm to about 700 µm.

Figure 10A:
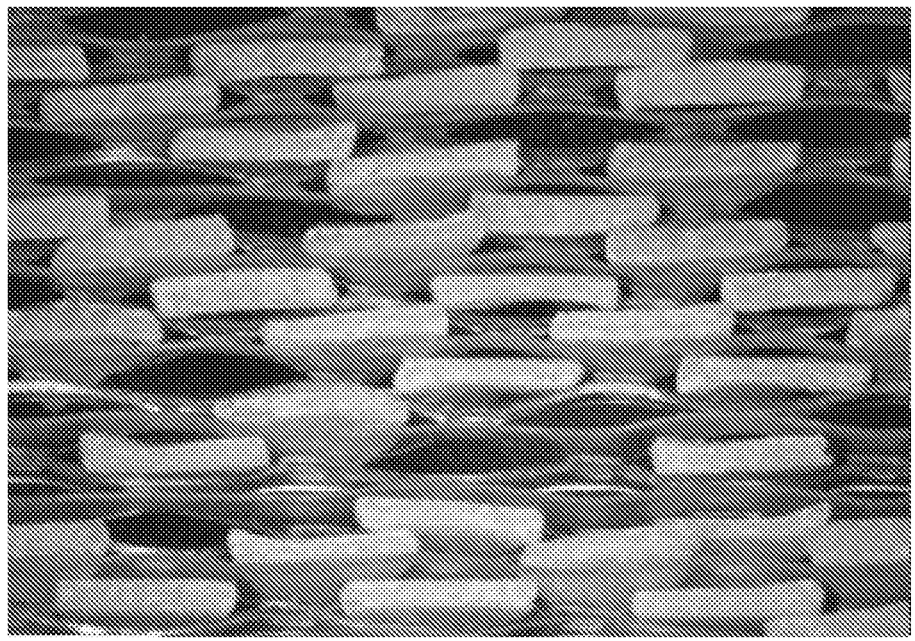
FIGS. 10A-10B are perspective views of opposed major surfaces of the transfer tool used in the working example of the present disclosure, wherein the transfer tool is in the unextended state and loaded with shaped abrasive grains.
Figure 10B:
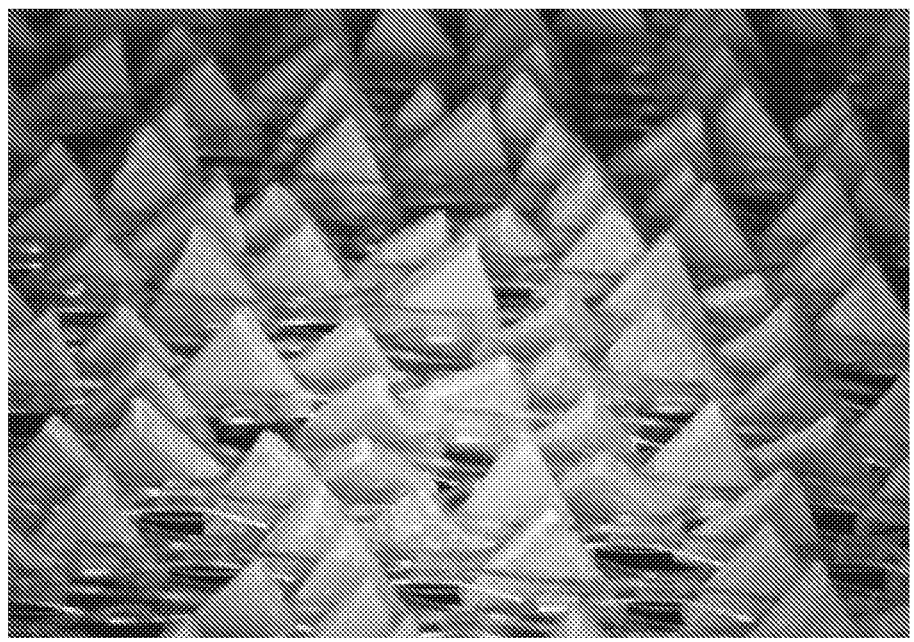

The shaped abrasive grains were applied on the first major surface of the transfer tool when transfer tool was stretched along the cross-machine direction, and substantially all of the grains fell into the apertures by gravity. The transfer tool was then relaxed along the cross-machine direction to its original state, and substantially all of the shaped abrasive grains were locked into place between the polymeric strands and the ribbons in the transfer tool. The first major surface of the loaded transfer tool is shown in FIG. 10A, and the shaped abrasive grains are locked in an orientation in which one edge faces upward. The second major surface of the transfer tool is shown in FIG. 10B, and the vertices of the shaped abrasive grains point in the same direction.

Figure 11:
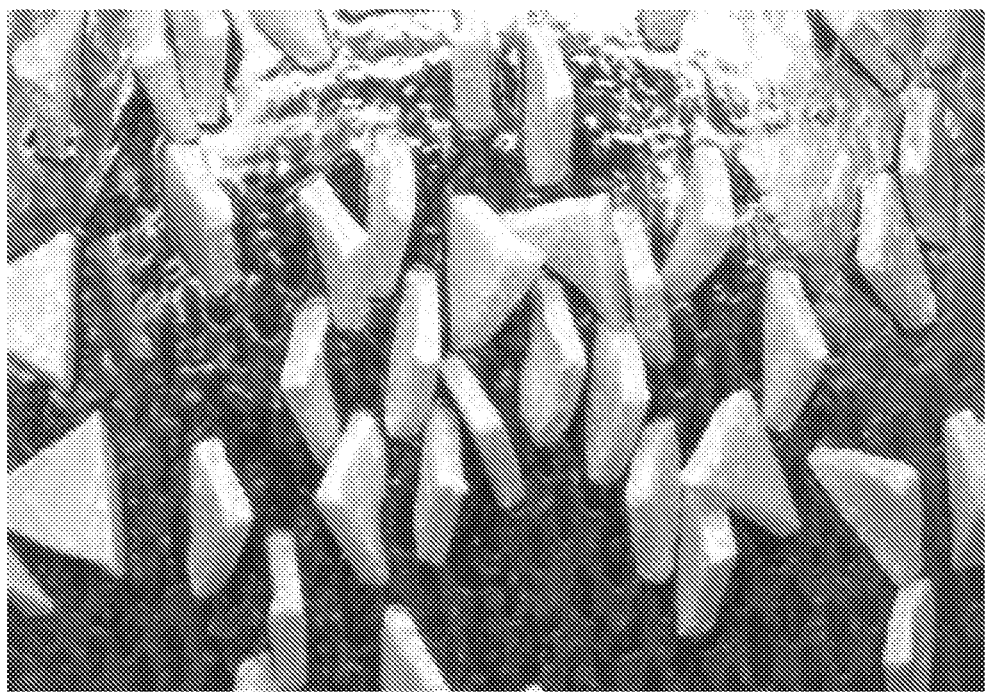
FIG. 11 is an overhead view of shaped abrasive grains deposited on a particle adherent surface of a backing using the transfer tool of the working examples of the present disclosure.

The transfer tool was then extended again along the cross-machine direction over a web-like substrate polyester film backing of a double sided tape available from 3M, St. Paul, Minn. under the trade designation 3M Double Coated Tape 9690. The tape was coated with a particle adherent layer of an adhesive available under the trade designation 3M Laminating Adhesive 300 MP from 3M. When the transfer tool was in the stretched state, a substantial number of the shaped abrasive grains dislodged from the transfer tool and transferred to the particle adherent layer in a preferred orientation with the edges contacting the particle adherent layer (FIG. 11).

Embodiments

A. A method of transferring a shaped particle to a substrate, the method comprising: providing a scrim comprising at least two elongate strands periodically joined together at bond regions to form an array of apertures between the strands, wherein the apertures have a first minimum dimension, and wherein at least some of the bond regions are flexible; extending the scrim along at least one direction to form an extended scrim, wherein in the extended scrim the apertures increase in size to a second minimum dimension larger than the first minimum dimension to form an array of extended apertures; applying shaped particles to the extended scrim such that at least a portion of the shaped particles enter in at least some of the extended apertures; relaxing the extended scrim to form an array of unextended apertures with the first minimum dimension, wherein the shaped particles are frictionally retained in the unextended apertures to form a particle loaded scrim; extending the particle loaded scrim along at least one direction to form an extended particle loaded scrim with extended apertures having the second minimum dimension, wherein in the extended particle loaded scrim the shaped particles are released from the extended apertures; and transferring the shaped particles released from the extended particle loaded scrim to the substrate such that the shaped particles are deposited on the substrate in a predetermined orientation.

B. The method of embodiment A, wherein the substrate web comprises a binder layer thereon, and the shaped particles are deposited on the binder layer in the oriented position.

C. The method of either of embodiments A or B, wherein at least 95% of the shaped particles are deposited on the substrate web in an oriented position.

D. The method of any of the embodiments A-C, wherein at least 99% of the shaped particles are deposited on the substrate web in an oriented position.

E. The method any of embodiments A-D, wherein the shaped particles deposited on the substrate are aligned in a first direction on the web and offset by a predetermined distance in a second direction normal to the first direction.

F. The method of any of embodiments A-E, wherein the elongate strands are polymeric.

G. The method of embodiment F, wherein the scrim has first and second opposing major surfaces and further comprises polymeric ribbons with a thickness-to-width aspect ratio of at least 2:1 and a minor surface defined by their width and length, and wherein the minor surface of a plurality of the polymeric ribbons in bonded to the first major surface of the scrim.

H. The method of embodiment G, wherein each polymeric ribbon is bonded to only one of the polymeric strands in the scrim.

I. The method of embodiments G and H, wherein each polymeric ribbon is intermittently bonded to a strand.

J. The method of any of embodiments G-I, wherein each polymeric ribbon is continuously bonded along the length of a polymeric strand.

K. The method of any of embodiments G-J, wherein at least some of the polymeric strands and the polymeric ribbons are elastic.

L. The method of any of embodiments G-K, wherein the height-to-width aspect ratio of the polymeric ribbons is at least 3:1.

M. The method of any of embodiments G-L, wherein at least some of the polymeric ribbons have a width that is smaller than a width of at least some of the polymeric strands.

N. The method of any of embodiments G-M, wherein at least some of the polymeric ribbons have a height that is greater than a height of at least some of the polymeric strands.

O. The method of any of embodiments G-N, wherein the polymeric ribbons comprise a different polymeric composition than at least some of the polymeric strands.

P. The method of any of embodiments G-O, wherein at least some of the polymeric ribbons have a different color than at least some of the polymeric strands.

Q. The method of any of embodiments G-P, wherein the minor surface of a second plurality of the polymeric ribbons are bonded to the second major surface of the netting layer.

R. The method of any of embodiments A-Q, wherein the elongate strands in the scrim comprise a metal.

S. The method of embodiment R, wherein the strands comprise metal wires.

T. The method of embodiment S, wherein the metal wires overlap each other at the bond regions to form a flexible metal mesh.

U. A method of transferring shaped particles to a moving substrate web, the method comprising: providing a transfer tool moving in a first direction, wherein the transfer tool comprises a stretchable net-like arrangement of polymeric strands periodically joined together at bond regions to form an array of apertures therebetween, and wherein the apertures have a first minimum dimension; emitting shaped particles from a particle source onto a major surface of the moving transfer tool; stretching the transfer tool along a second direction substantially normal to the first direction to form a stretched transfer tool, wherein the stretched transfer tool comprises expanded apertures with a second minimum dimension larger than the first minimum dimension, and wherein the second minimum dimension is sufficiently large to allow entry of at least a portion of the shaped particles into the apertures with a first predetermined orientation; relaxing the stretched transfer tool along the second direction such that the apertures return to the first minimum dimension and form a loaded transfer tool having particles frictionally retained between the polymeric strands in the first orientation; stretching the loaded transfer tool along the second direction to expand the apertures to the second minimum dimension and release the shaped particles frictionally retained therein; and transferring the shaped particles released from the loaded transfer tool to a particle adherent surface of a moving substrate web, wherein a substantial portion of the shaped particles are transferred to the particle adherent surface and adhere to the particle adherent surface in a second predetermined orientation.

V. The method of embodiment U, wherein at least 95% of the shaped particles reside in the second orientation on the particle adherent surface.

W. The method of any of embodiments U-V, wherein the shaped particles reside on the particle adherent surface aligned in a first direction on the web and offset by a predetermined distance in a second direction normal to the first direction.

X. The method of any of embodiments, U-W, wherein the transfer tool is further stretched in a second direction normal to the first direction to release the shaped particles.

Y. The method of any of embodiments U-X, further comprising applying a vacuum to the moving transfer tool to assist in depositing the shaped particles in the apertures thereof.

Z. The method of any of embodiments U-Y, further comprising applying a vacuum to the moving transfer tool to assist in dislodging the shaped particles from the apertures of the transfer tool.

AA. The method of any of embodiments U-Z, wherein the moving transfer tool is an endless belt.

BB. The method of any of embodiments U-AA, wherein the net-like array has first and second opposing major surfaces and further comprises polymeric ribbons with a thickness-to-width aspect ratio of at least 2:1 and a minor surface defined by their width and length, and wherein the minor surface of a plurality of the polymeric ribbons in bonded to the first major surface of the net-like array.

CC. The method of embodiment BB, wherein each polymeric ribbon is bonded to only one of the polymeric strands in the array.

DD. The method of embodiment CC, wherein at least some of the polymeric ribbons and polymeric strands are elastic.

EE. The method of any of embodiments U-DD, wherein the shaped particles comprise abrasive grains.

FF. The method of any of embodiments U-EE, wherein the shaped abrasive grains comprise a uniform triangular prism.

GG. The method of any of embodiments U-FF, wherein the shaped particles comprise uniform triangular prisms, and wherein one vertex of the prism extends into the apertures in the net-like array and protrudes from the second major surface of the net-like array, and a side of the prism opposite the vertex in the aperture rests against a major surface of a polymeric ribbon such that the side of the prism opposite the vertex protrudes from the first major surface of the net-like array and is substantially parallel to the first major surface of the net-like array.

HH. A method of making an abrasive article, comprising: moving a stretchable polymeric scrim along a first direction, wherein the scrim comprises at least two elongate polymeric strands periodically joined together at bond regions to form an array of apertures between the strands, wherein the scrim has first and second opposing major surfaces and further comprises polymeric ribbons with a thickness-to-width aspect ratio of at least 2:1 and a minor surface defined by their width and length, and wherein the minor surface of a plurality of the polymeric ribbons in bonded to at least a portion of the first major surface of the array of polymeric strands; applying shaped abrasive particles to a relaxed scrim, wherein the relaxed scrim comprises relaxed apertures with a first minimum dimension selected such that the shaped abrasive particles rest on the first major surface of the array of polymeric strands and the relaxed apertures remain unoccupied by the shaped abrasive particles; stretching the scrim along a second direction normal to the first direction to increase the size of the apertures from a first minimum dimension to a second minimum dimension larger than the first minimum dimension and form expanded apertures, wherein at least a portion of each abrasive particle enters the expanded apertures and a second portion of each abrasive particle contacts the polymeric ribbons; relaxing the stretched scrim along the second direction such that the expanded apertures decrease in size to the first minimum dimension and the abrasive particles are frictionally retained against the polymeric strands and the polymeric ribbons to form a particle loaded scrim; and transferring the particle loaded scrim to a binder layer on a substrate such that a selected portion of the shaped abrasive particles contact the binder layer in a predetermined orientation.

II. An abrasive article, comprising: an adhesive binder layer on a backing; and shaped abrasive grains on the adhesive binder layer, wherein the shaped abrasive grains comprise uniform triangular prisms, wherein at least 95% of the grains contact the adhesive binder layer in an orientation such that one side thereof is substantially parallel to a major surface of the backing, and wherein a vertex of each grain opposite the one side contacting the adhesive binder layer extends above the adhesive binder layer.

JJ. The abrasive article of embodiment II, wherein at least 99% of the grains contact the adhesive binder layer in the predetermined orientation.

KK. The abrasive article of any of embodiments II-JJ, wherein the grains are arranged in substantially parallel rows along at least one of a length or a width of the backing.

LL. The abrasive article of embodiment KK, wherein the rows are separated by a distance of about 1 micron to about 10 microns.

MM. The abrasive article of any of embodiments II-LL, wherein the grains are arranged in substantially parallel rows along the length of the backing and in offset rows along the width of the backing.

NN. A method of making an abrasive article, comprising: providing a patterned positioning element, wherein the patterned positioning element comprises a stretchable polymeric scrim comprising elongate polymeric strands periodically joined together at flexible bond regions to form an array of apertures between the strands, wherein the apertures have a first minimum dimension when the positioning element is in a relaxed state, and wherein the first minimum dimension is selected to allow entry into the apertures of at least a portion of a triangular prism-shaped abrasive particle, wherein the scrim has first and second opposing major surfaces and further comprises polymeric ribbons with a thickness-to-width aspect ratio of at least 2:1 and a minor surface defined by their width and length, and wherein the minor surface of a plurality of the polymeric ribbons in bonded to the first major surface of the scrim; depositing the shaped abrasive particles on the first major surface of the positioning element in the relaxed state, wherein apertures in the relaxed state remain unoccupied by the shaped abrasive particles; stretching the patterned positioning element along at least one direction to form a stretched positioning element, wherein the stretching expands the apertures to form expanded apertures with a second minimum dimension larger than the first minimum dimension, and wherein the second minimum dimension is selected to accept at least a portion of the abrasive particles; relaxing the patterned positioning element to form a loaded patterned positioning element, wherein in the loaded patterned positioning element one vertex of at least 95% of the shaped abrasive particles resides in an aperture in the scrim and a portion of each shaped abrasive particle rests against a ribbon.

OO. The method of embodiment NN, further comprising contacting the loaded patterned positioning element with a binder layer on a polymeric backing to form an abrasive article, wherein a substantial portion of the abrasive particles are oriented such that a side of the abrasive particles opposite the vertex thereof contacts the binder layer.

PP. The method of any of embodiments NN-OO, further comprising stretching the loaded patterned positioning element to release the abrasive particles retained therein, wherein the particles released from the loaded patterned positioning element are transferred to a binder layer on a polymeric backing, and wherein at least 95% of the shaped abrasive particles are arranged on the back such that the vertices thereof extend upward from a plane of the backing.

Various embodiments of the invention have been described. These and other embodiments are within the scope of the following claims.

The invention claimed is:

1. A method of transferring a shaped particle to a substrate, the method comprising:
 providing a scrim comprising at least two elongate strands periodically joined together at bond regions to form an array of apertures between the strands, wherein the apertures have a first minimum dimension, and wherein at least some of the bond regions are flexible;
 extending the scrim along at least one direction to form an extended scrim, wherein in the extended scrim the apertures increase in size to a second minimum dimension larger than the first minimum dimension to form an array of extended apertures;
 applying shaped particles to the extended scrim such that at least a portion of the shaped particles enter in at least some of the extended apertures;
 relaxing the extended scrim to form an array of unextended apertures with the first minimum dimension, wherein the shaped particles are frictionally retained in the unextended apertures to form a particle loaded scrim;
 extending the particle loaded scrim along at least one direction to form an extended particle loaded scrim with extended apertures having the second minimum dimension, wherein in the extended particle loaded scrim the shaped particles are released from the extended apertures; and
 transferring the shaped particles released from the extended particle loaded scrim to the substrate such that the shaped particles are deposited on the substrate in a predetermined orientation.

2. The method of claim 1, wherein the substrate web comprises a binder layer thereon, and the shaped particles are deposited on the binder layer in the oriented position.

3. The method of claim 1, wherein at least 95% of the shaped particles are deposited on the substrate web in an oriented position.

4. The method of claim 1, wherein the elongate strands are polymeric.

5. The method of claim 4, wherein the scrim has first and second opposing major surfaces and further comprises polymeric ribbons with a thickness-to-width aspect ratio of at least 2:1 and a minor surface defined by their width and length, and wherein the minor surface of a plurality of the polymeric ribbons in bonded to the first major surface of the scrim.

6. The method of claim 4, wherein at least some of the polymeric strands are elastic.

7. The method of claim 1, wherein the elongate strands in the scrim comprise a metal.

8. A method of transferring shaped particles to a moving substrate web, the method comprising:
 providing a transfer tool moving in a first direction, wherein the transfer tool comprises a stretchable net-like arrangement of polymeric strands periodically joined together at bond regions to form an array of apertures therebetween, and wherein the apertures have a first minimum dimension;
 emitting shaped particles from a particle source onto a major surface of the moving transfer tool;
 stretching the transfer tool along a second direction substantially normal to the first direction to form a stretched transfer tool, wherein the stretched transfer tool comprises expanded apertures with a second minimum dimension larger than the first minimum dimension, and wherein the second minimum dimension is sufficiently large to allow entry of at least a portion of the shaped particles into the apertures with a first predetermined orientation;
 relaxing the stretched transfer tool along the second direction such that the apertures return to the first minimum dimension and form a loaded transfer tool having particles frictionally retained between the polymeric strands in the first orientation;
 stretching the loaded transfer tool along the second direction to expand the apertures to the second minimum dimension and release the shaped particles frictionally retained therein; and
 transferring the shaped particles released from the loaded transfer tool to a particle adherent surface of a moving substrate web, wherein a substantial portion of the shaped particles are transferred to the particle adherent surface and adhere to the particle adherent surface in a second predetermined orientation.

9. The method of claim 8, wherein at least 95% of the shaped particles reside in the second orientation on the particle adherent surface.

10. The method of claim 8, wherein the moving transfer tool is an endless belt.

11. The method of claim 7, wherein at least some of the polymeric ribbons and polymeric strands are elastic.

12. The method of claim 7, wherein the shaped particles comprise abrasive grains.

13. The method of claim 10, wherein the shaped abrasive grains comprise a uniform triangular prism.

* * * * *

UNITED STATES PATENT AND TRADEMARK OFFICE
CERTIFICATE OF CORRECTION

PATENT NO. : 11,090,780 B2
APPLICATION NO. : 16/331279
DATED : August 17, 2021
INVENTOR(S) : Thomas Nelson It is certified that error appears in the above-identified patent and that said Letters Patent is hereby corrected as shown below:

In the Claims

Column 28
Line 2, In Claim 5, delete "in" and insert -- are --, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*